United States Patent
Deo et al.

(10) Patent No.: US 10,558,789 B2
(45) Date of Patent: Feb. 11, 2020

(54) CREATING AND IMPLEMENTING SCALABLE AND EFFECTIVE MULTIMEDIA OBJECTS WITH HUMAN INTERACTION PROOF (HIP) CAPABILITIES, WITH CHALLENGES COMPRISING DIFFERENT LEVELS OF DIFFICULTY BASED ON THE DEGREE ON SUSPICIOUSNESS

(75) Inventors: Shekhar Deo, Fremont, CA (US); Manoj Rajshekar, Fremont, CA (US)

(73) Assignee: [24]7.ai, Inc., San Jose, CA (US)

( * ) Notice: Subject to any disclaimer, the term of this patent is extended or adjusted under 35 U.S.C. 154(b) by 1055 days.

(21) Appl. No.: 13/566,690

(22) Filed: Aug. 3, 2012

(65) Prior Publication Data

US 2013/0036342 A1    Feb. 7, 2013

Related U.S. Application Data

(60) Provisional application No. 61/515,636, filed on Aug. 5, 2011.

(51) Int. Cl.
| G06F 21/31 | (2013.01) |
| G06Q 30/02 | (2012.01) |
| G06F 21/36 | (2013.01) |

(52) U.S. Cl.
CPC .............. *G06F 21/31* (2013.01); *G06F 21/36* (2013.01); *G06Q 30/02* (2013.01); *G06F 2221/2103* (2013.01); *G06F 2221/2133* (2013.01)

(58) Field of Classification Search
CPC ....... G06F 17/30017; G06F 2221/2133; G06F 2221/2103
USPC ................................................. 715/201, 202
See application file for complete search history.

(56) References Cited

U.S. PATENT DOCUMENTS

| 5,933,811 A * | 8/1999 | Angles et al. ............. 705/14.56 |
| 7,366,919 B1 * | 4/2008 | Sobel ...................... H04L 51/12 713/150 |
| 7,904,517 B2 | 3/2011 | Kang et al. |
| 8,255,393 B1 * | 8/2012 | Yu ........................ H04L 63/1441 707/724 |
| 8,473,336 B1 * | 6/2013 | Simmons ..................... 705/14.1 |
| 8,510,795 B1 | 8/2013 | Gargi et al. |
| 8,542,251 B1 * | 9/2013 | Gossweiler, III ... G06F 3/04883 345/649 |
| 8,595,186 B1 | 11/2013 | Mandyam et al. |

(Continued)

OTHER PUBLICATIONS

Ron Jacobs, How to do API Key Verification for REST Services in .NET 4, Jun. 14, 2010, <URL: http://blogs.msdn.com/b/rjacobs/archive/2010/06/14/how-to-do-api-key-verification-for-rest-services-in-net-4.aspx>.*

*Primary Examiner* — Cesar B Paula
*Assistant Examiner* — Yahao Chen
(74) *Attorney, Agent, or Firm* — Perkins Coie LLP; Michael A. Glenn; Alberto Araiza

(57) ABSTRACT

Techniques are provided that generated interactive and dynamic multimedia objects (MMOs) with HIP capabilities which may be used in online advertising, brand engagement, online promotions, surveys, security, and user-defined security. Techniques combining interactive multimedia objects with HIP capabilities assist advertisers and websites by creating an effective impression of any multimedia object on a user as well as providing security for a website by providing a more natural user interaction and ease of use while maintaining security. A wide variety of workflows and features by which users engage with such multimedia objects are provided.

21 Claims, 14 Drawing Sheets

(56) References Cited

U.S. PATENT DOCUMENTS

| | | | |
|---|---|---|---|
| 8,621,578 B1* | 12/2013 | Blomquist | G06F 21/36 713/182 |
| 8,892,673 B1 | 11/2014 | Roskind et al. | |
| 9,621,528 B2 | 4/2017 | Rajshekar et al. | |
| 2004/0003258 A1* | 1/2004 | Billingsley et al. | 713/182 |
| 2004/0267886 A1* | 12/2004 | Malik | H04L 51/12 709/206 |
| 2005/0120201 A1 | 6/2005 | Benaloh et al. | |
| 2005/0138376 A1* | 6/2005 | Fritz et al. | 713/168 |
| 2005/0193076 A1* | 9/2005 | Flury | H04L 12/585 709/206 |
| 2005/0288954 A1 | 12/2005 | McCarthy et al. | |
| 2007/0033102 A1 | 2/2007 | Frank et al. | |
| 2007/0101010 A1 | 5/2007 | Ellison et al. | |
| 2007/0234423 A1* | 10/2007 | Goodman et al. | 726/21 |
| 2007/0255953 A1 | 11/2007 | Peyret et al. | |
| 2007/0283416 A1* | 12/2007 | Renaud | G06F 21/31 726/2 |
| 2008/0005126 A1* | 1/2008 | Sankaran et al. | 707/10 |
| 2008/0109657 A1 | 5/2008 | Bajaj et al. | |
| 2008/0133321 A1* | 6/2008 | Pennock et al. | 705/10 |
| 2008/0133347 A1* | 6/2008 | Josifovski et al. | 705/14 |
| 2008/0133348 A1* | 6/2008 | Reed et al. | 705/14 |
| 2008/0147456 A1* | 6/2008 | Broder et al. | 705/7 |
| 2009/0012855 A1* | 1/2009 | Jamal et al. | 705/14 |
| 2009/0043812 A1* | 2/2009 | Rigdon | G07C 9/00134 |
| 2009/0150983 A1* | 6/2009 | Saxena | G06F 21/36 726/7 |
| 2009/0186635 A1* | 7/2009 | Vieri | 455/466 |
| 2009/0204819 A1* | 8/2009 | Parker | 713/182 |
| 2009/0210937 A1* | 8/2009 | Kraft et al. | 726/17 |
| 2009/0232351 A1 | 9/2009 | Kagitani et al. | |
| 2009/0249476 A1* | 10/2009 | Seacat | G06F 21/31 726/17 |
| 2009/0249477 A1 | 10/2009 | Punera | |
| 2009/0319271 A1 | 12/2009 | Gross et al. | |
| 2009/0328175 A1 | 12/2009 | Shuster et al. | |
| 2010/0031287 A1* | 2/2010 | Simon et al. | 725/38 |
| 2010/0037147 A1* | 2/2010 | Champion et al. | 715/751 |
| 2010/0049526 A1 | 2/2010 | Lewis et al. | |
| 2010/0201478 A1* | 8/2010 | Veen et al. | 340/3.1 |
| 2010/0229223 A1* | 9/2010 | Shepard | G06F 21/31 726/5 |
| 2010/0287229 A1 | 11/2010 | Hauser et al. | |
| 2010/0302255 A1* | 12/2010 | Brown et al. | 345/473 |
| 2010/0306055 A1 | 12/2010 | Kolb et al. | |
| 2010/0318669 A1* | 12/2010 | Chugh | 709/229 |
| 2011/0029781 A1* | 2/2011 | Clark | G06F 21/31 713/182 |
| 2011/0029902 A1* | 2/2011 | Bailey | G06F 21/36 715/764 |
| 2011/0106631 A1* | 5/2011 | Lieberman et al. | 705/14.72 |
| 2011/0150267 A1 | 6/2011 | Snelling et al. | |
| 2011/0159842 A1* | 6/2011 | Vander Veen | G01S 19/14 455/410 |
| 2011/0166916 A1* | 7/2011 | Inbar | 705/14.4 |
| 2011/0196722 A1* | 8/2011 | Punera | G06Q 30/0185 705/14.11 |
| 2011/0209076 A1* | 8/2011 | Saxena | G06F 21/36 715/764 |
| 2011/0258024 A1* | 10/2011 | Prince | 705/14.14 |
| 2011/0276410 A1 | 11/2011 | Hjelm et al. | |
| 2012/0054834 A1 | 3/2012 | King et al. | |
| 2012/0130801 A1* | 5/2012 | Baranov et al. | 705/14.43 |
| 2012/0130802 A1* | 5/2012 | Shimizu | 705/14.44 |
| 2012/0154434 A1* | 6/2012 | Costea | 345/629 |
| 2012/0192252 A1* | 7/2012 | Kuo | G06F 21/31 726/4 |
| 2012/0246008 A1* | 9/2012 | Hamilton, II | G06Q 30/02 705/14.66 |
| 2012/0254940 A1 | 10/2012 | Raper et al. | |
| 2012/0254964 A1 | 10/2012 | Kumar et al. | |
| 2012/0254971 A1* | 10/2012 | Hu et al. | 726/9 |
| 2012/0297190 A1* | 11/2012 | Shen et al. | 713/168 |
| 2013/0007872 A1 | 1/2013 | Hariharan et al. | |

\* cited by examiner

Have something to say? Post your comment

Comments are moderated and will be allowed if they are about the topic and not abusive.

Your comment

Characters remaining (3000)

To post this comment you must log in.

Log In/Connect with: [facebook] [twitter] [More Login Options >]

or

Fill in your details:

Name
Will be displayed

Email
Will not be displayed

Location
Will be displayed

Share this Comment:
☐ Post to Facebook   ☐ Post to Twitter

Please answer this simple math question.

1 + 3 = [      ]   [Post comment]

*FIG. 8*

CREATING AND IMPLEMENTING SCALABLE AND EFFECTIVE MULTIMEDIA OBJECTS WITH HUMAN INTERACTION PROOF (HIP) CAPABILITIES, WITH CHALLENGES COMPRISING DIFFERENT LEVELS OF DIFFICULTY BASED ON THE DEGREE ON SUSPICIOUSNESS

CROSS REFERENCE TO RELATED APPLICATIONS

This patent application claims priority to U.S. Provisional Patent Application Ser. No. 61/515,636, SYSTEM AND METHOD FOR CREATING AND IMPLEMENTING DYNAMIC, INTERACTIVE AND EFFECTIVE MULTIMEDIA OBJECTS WITH HUMAN INTERACTION PROOF (HIP) CAPABILITIES, filed Aug. 5, 2011, the entirety of which is incorporated herein by reference thereto.

BACKGROUND OF THE INVENTION

Technical Field

This invention relates generally to the field of multimedia objects and human interactive proof (HIP) technology. More specifically, this invention relates to creating and deploying dynamic multimedia objects that may or may not be embedded with HIP capability.

Description of the Related Art

Online advertising has emerged as an important element of any advertising campaign. However, the effectiveness of the existing advertisement (ad) formats such as online banner ads is far from optimal. Several banner ads on a webpage crave for attention and have led to a phenomenon called banner blindness. Banner blindness is a phenomenon in web usability where visitors on a website ignore banner-like information. Indeed, web usability tests are regularly proving that, knowingly or unknowingly, the users are ignoring ads or images.

The similar problem exists in the mobile, tablet or any small screen device capable of accessing information and ads. Human attention on ads is not effectively captured today.

The growth of internet usage across different interfaces and devices has led to widespread adoption across all demographics. The number of websites is ever increasing and more financial transactions happen on the internet. Websites are widely used to provide users with a convenient means to buy tickets, access personal account information, open new email accounts, add content to existing content such as comments on blogs, upload multimedia content on websites, or to access other services. Such systems are not only convenient to website owners as well as to their users, but also reduce overall costs.

Unfortunately, such systems can also provide a loophole through which hackers can obtain access to personal or other restricted data, disrupt services, poison existing content with irrelevant information declining the value of existing content, consume all the resources of the website for malicious activities, and distribute worms or spam. Such activity is commonly performed through the use of automated bots, scripts, and other malicious computer programs.

The above-described activity has led to the development of Human Interactive Proof (HIP) technology. HIPs are challenges that can be presented via software to a user to help insure that a human being, as opposed to an automated system, is interacting with the software. A HIP challenge must be simple enough so that users aren't discouraged from using a service. However, at the same time the HIP challenge must be difficult enough to make the cost of developing or processing a malicious bot or script to break such HIP uneconomical and challenging.

One form of an HIP which is widely used is a Completely Automated Public Turing test to tell Computers and Humans Apart (CAPTCHA.) CAPTCHA technology is a particular challenge—response system that attempts to ensure the response is from a human, which helps to isolate the human traffic from the malicious bot or script traffic. An example of a CAPTCHA is shown in FIG. 3, left-hand side. In this example, a challenge 302 is presented on a typical sign in webpage 300. In this example, the user is required to type in a response answer in a response textbox 303. CAPTCHAS are fast becoming pervasive across the Internet because as websites move towards collaborative user-generated content and increased web resources, the need of distinguishing genuine users from bots and scripts and maintaining user privacy is important.

SUMMARY OF THE INVENTION

Techniques are provided that generate interactive and dynamic multimedia objects (MMOs) with HIP capabilities which may be used in online advertising, brand engagement, online promotions, surveys, security, and user-defined security. Techniques combining interactive multimedia objects with HIP capabilities assist advertisers and websites by creating an effective impression of any multimedia object on a user as well as providing security for a website by providing a more natural user interaction and ease of use while maintaining security. A wide variety of workflows and features by which users engage with such multimedia objects are provided.

BRIEF DESCRIPTION OF THE DRAWINGS

FIG. 8 is a sample screen shot of a webpage at which the user would like to add a comment, according to an embodiment;

DETAILED DESCRIPTION OF THE INVENTION

Techniques are provided that generate interactive and dynamic multimedia objects (MMOs) with HIP capabilities which may be used in online advertising, engagement, security, and user-defined security. Techniques combining interactive multimedia objects with HIP capabilities assist advertisers, marketers and websites by creating an effective impression of any multimedia object on a user as well as providing security for a website by providing a more natural user interaction and ease of use while maintaining security. A wide variety of workflows and features by which users engage with such multimedia objects are provided.

Terminology

For purposes of understanding embodiments herein, the following terminology and acronyms may be used:

A Multimedia Object (MMO) may be any multimedia item such as an online advertisement, a static image, a video, an audio, and text. Further, it should be appreciated that such MMO may or may not have HIP embedded in it. An MMO may be interactive or non-interactive. An MMO may be comprised of rich media for example.

Multimedia object server (MMOS) is a server which serves MMOs as described hereinabove.

Validation and Verification server (VS) is a server which validates and verifies user response against the HIP challenge.

Multimedia object administration server (MMOAS) is a server which administrates the MMOs and contains additional information, e.g. metadata, for all MMOs.

HIP—Human Interaction Proof is a technology that is presented via a programmed system to a user to help ensure that a human being, as opposed to an automated system, is interacting with the programmed system. It is generally presented as a challenge to the user, and is also known as a CAPTCHA or a HIP challenge or a HIP CAPTCHA, for which a valid response from user is expected. A challenge of HIP can be described as any system interaction which system generates and sends to the user to make and enable user to perform the intended interaction on the system to ensure that the interaction is made only from a human. A response can be described as the interactions with the system which are done on the posed challenge to ensure that the user who interacted is human. For example, the challenge can be a text message "drag this picture from point A to point B" appearing on computer screen, for which the response is the dragging action of the picture by the user on the computer screen. It should be appreciated that a Human Interaction Proof system may or may not include multimedia objects.

Figure 3:
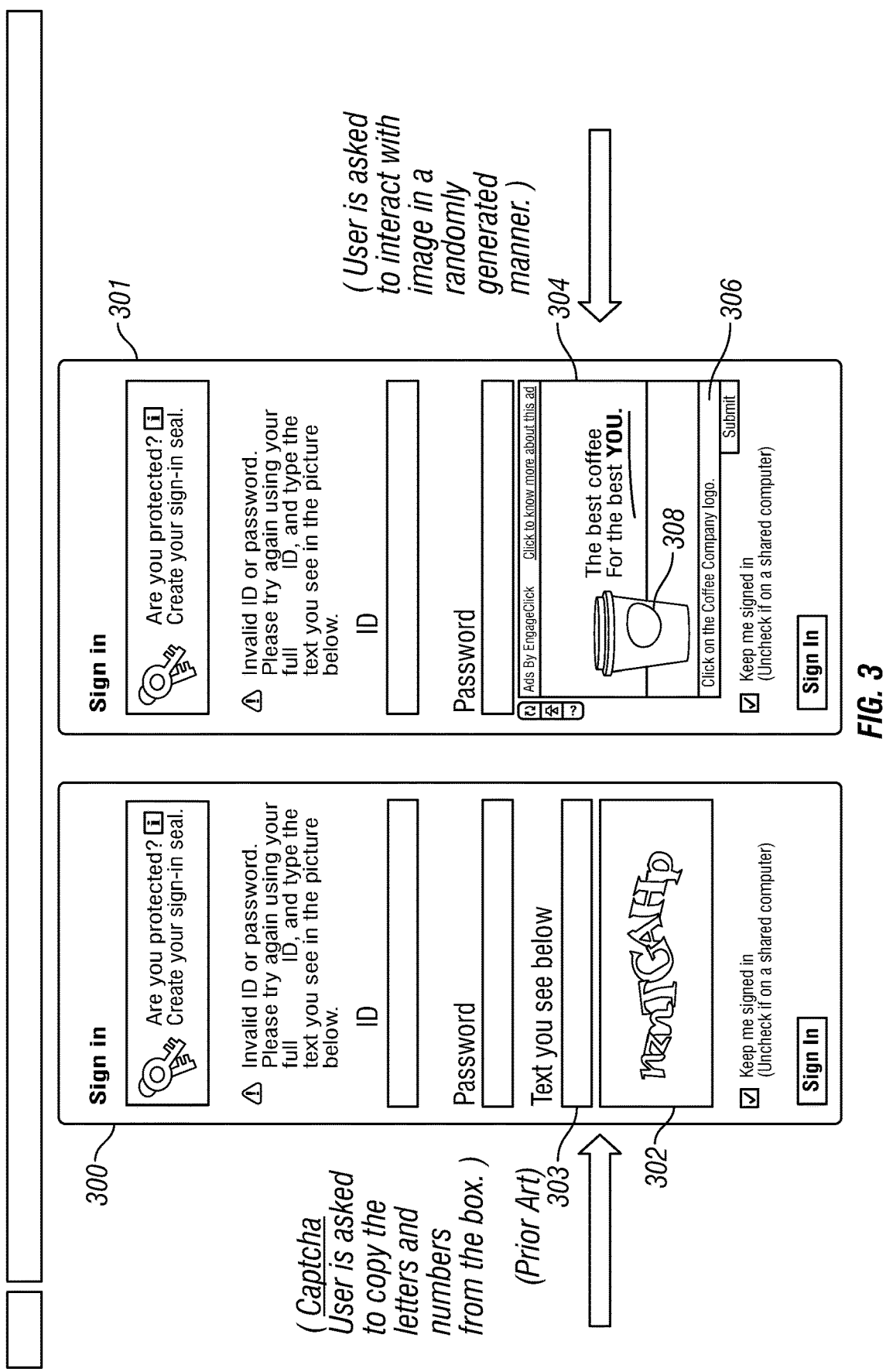
FIG. 3 is a schematic diagram showing a comparison of two exemplary sign in webpages where the left-hand sign in webpage is in accordance with the prior art and the right-hand sign in webpage is according to an embodiment.

Embodiments herein provide an innovative solution that creates interactive, dynamic and effective multimedia objects (MMOs) with HIP capabilities which may be used in online advertising, security, and user-defined security. Some embodiments leverages existing HIP CAPTCHA real estate and create multimedia objects that may guarantee a captivated audience, especially in online advertising. Combining interactive multimedia objects with HIP capabilities as provided by embodiments herein helps to meet a very critical need faced by advertisers and websites today—creating an effective impression of any multimedia object on a user, i.e. provided a guaranteed eyeball. Also, the current format of CAPTCHAs involve deciphering distorted text which is usually difficult for a user to do and causes a break in the natural flow of the user's interaction with the website. Further, CAPTCHAs are not very user friendly and occupy precious real estate without providing any monetization. Thus, embodiments herein provide a variety of formats that involve users interacting with multimedia objects to provide a more natural user interaction and ease of use while maintaining security. An embodiment can be understood with reference to FIG. 3. The right-hand side of FIG. 3 shows a sample user interface of a sign in page 301, which uses an interactive multimedia object with HIP capabilities 304 for the user to prove that s/he is indeed a human. In this particular example, the multimedia object provides an instruction in text form 306 for a Starbucks logo, by the Starbucks Corporation, Seattle, Wash. The instruction states, "Click on the Starbucks logo." Thus, in this example, when the user moves his or her mouse over the logo 308 and clicks, then the challenge is satisfied.

SUMMARY OF FEATURES

Following is a summary list of features that are provided by one or more embodiments herein. Detailed discussion about each feature is provided hereinbelow.

Interactive Multimedia Object capable of being turned on and off for the HIP features;

Interactive Multimedia Object capable of being turned on and off for the HIP features and follow a workflow, i.e. a sequence of appearance of same or different type of relevant multimedia objects with or without HIP capability. For example, if a workflow allows three web inventories where MMOs can appear, one single MMO can appear in all those three web inventories with HIP enabled in all of those MMOs or in some of them. In other cases, one MMO with HIP turned on or off may appear in the first inventory but other MMOs with HIP turned on or off may appear in other web inventories in the same workflow.

Interactive multimedia object with text based phrase helpful in financial and marketing campaigns. Examples include but are not limited to direct coupon codes and incremental reward based campaigns.

User defined personal HIPs. Extension can be added to split response for a challenge which may be sent to the user via various communication mechanisms. Examples include but are not limited to cellular text messages, email, and phone.

Methods to detect misuse of interactive Multimedia Objects.

Automatic HIP generation by methods which are random in nature and independent of multimedia object.

Random methods which can increase the unpredictability of the challenges are used to create different attributes of a challenge. There can be more than one method involved in creating a challenge. Some or all the methods can be random in nature. For example, a random method to pick five colors out of fifty can be used to pick random colors for any particular object, while another random method can pick three objects out of fifty objects where the color of the objects are to be filled. The other method which can be non-random in nature may work for example on placing the objects in an image in a manner which keeps the object equidistant to reach other.

Mobile based HIP challenges—motion based, gravity based, geo-location based, direction based. The attributes of mobile devices and software in the mobile devices can be used for creating challenges. For example, a camera based challenge may be based on a device-based challenge, however, mobile application-based challenges can be software based challenge.

Artificial Intelligence (AI) based HIP delivery. Based on suspicious or friendly HIP service caller zones, the level of toughness of HIPs can be managed.

Reward based HIPs system. Top HIPs solves gets rewarded.

Share user interactivity on the multimedia object.

Social based HIPs.

Bookmark an interactive multimedia object for future reference.

Voice based HIPs.

Subscription based HIPs for advertiser deals, etc.

Redirection to advertisement from an HIP.

Interactive multimedia objects for near field communications (NFC), radio-frequency identification (RFID)-based devices for HIP capabilities.

Challenge and response outside the MMO—for HIP

Morphed interactive MMO—Challenge inside the MMO and response outside the MMO.

Advanced MMO—Challenge and message inside the MMO and response outside the MMO.

It should be appreciated that the above-cited list of features is not meant to be exhaustive and are for illustrative purposes for understanding embodiments herein.

High Level Architecture and Message Flow

Figure 1:
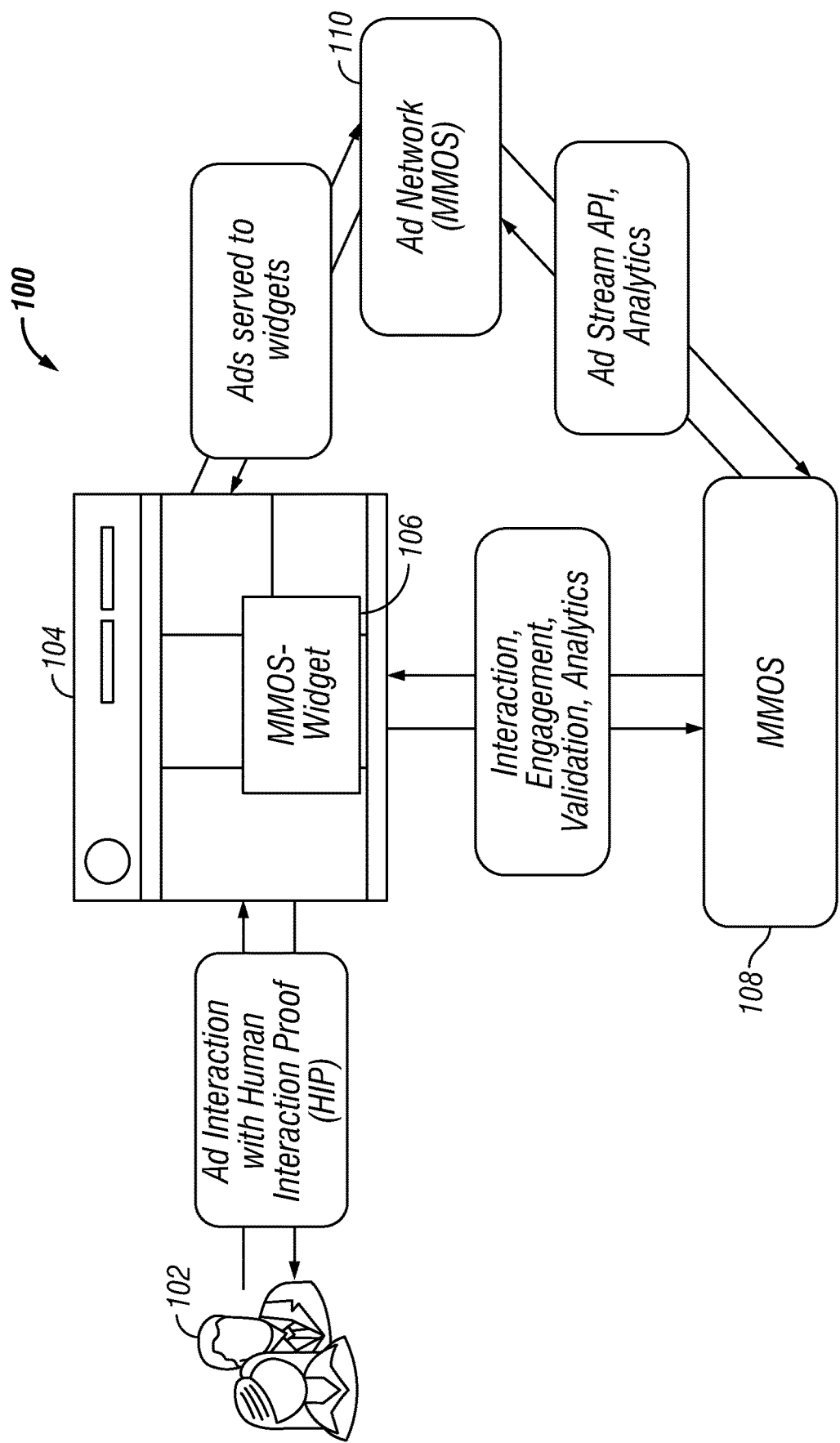
FIG. 1 is a schematic diagram of a high level architecture, according to an embodiment.

An embodiment can be understood with reference to FIG. 1, schematic diagram of a high level architecture. Users 102 go to a website 104, such as a publisher's website. Website 104 is configured to determine whether user 102 is a human or a bot. Website 104 contains a widget 106 and has capabilities to run widget 106. One of the functions of widget 106 is to identify whether user 102 is a human or a bot. When the page on website 104 is rendered, widget 106 makes a call to server 108. In an embodiment, when widget 106 makes the call to server 108, widget may send some information including but not limited to who is making the request, when is the request being made, what interactivity is requested, as well as some metadata, e.g. but not limited to the size of widget, the size of the image or multimedia object which is to be served, and the attributes such as widget border color, widget border thickness, widget background theme, and widget image of the multimedia object which website 104 needs to run. It should be appreciated that a set of one or more attributes can collectively be referenced as one theme.

Once server 108 receives such data, server 108 performs various processes including but not limited to the following. Server 108 determines whether website 104 is a legitimate website or publisher. If yes, server 108 parses the data and finds in a datastore (not shown) a matching multimedia object which needs to be served to the website 104 to fulfill the particular request. In an embodiment, a match may be found as follows. A matching algorithm at server 108 compares received parameters with parameters of stored multimedia objects to determine a matching multimedia object.

Once the match is found, server 108 sends back to website 104 the matched multimedia object along with a challenge. User 102 then sees the multimedia object and interacts with the multimedia object via the challenge. After user 102 interacts with the multimedia object by responding to the challenge, a response is sent to server 108 along with further details. In an embodiment, such details may include but are not limited to: what the user clicked on; how the user interacted; the question; the current time; the IP from where the response came from; and the duration of user's 102 interaction, etc.

Server 108 then compares the received response against validated responses. Upon determining that the received response is valid, server 108 sends a success notification back to website 104. From that point on, website 104 continues with its flow based on having received a success indication.

When server 108 determines there is no match for the received response, server 108 sends a failure notification back to website 104. Then, website 104 continues with its flow based on having received a failure indication.

It should be appreciated that the above-cited data received by server 108 may be used by server 108 in generating analytics.

As well, it should be appreciated that the any aspect of interactions by user 102 with the multimedia object are captured ultimate by server 108.

In an embodiment, an advertising (ad) serving network 110, referred to herein as ad network, is provided. Depending on implementation, ad network 110 may be an internal component of a larger environment which includes server 108 that serves widget 106 or may be an external component owned or controlled by a third party.

In an embodiment, server 108 receives the request data and performs various processes including determining whether website 104 is legitimate, as discussed hereinabove. However, in the embodiment, when server 108 tries to match what has been received with what is stored, server 108 goes to ad network 110 for an multimedia object and ad network 110 serves such multimedia object back to widget 106. Then, the user-widget interactivity occurs, the resulting data is sent to server 108 to determine success or failure as described above, and the process is complete.

In an embodiment, data received by server 108 about user 102 interaction may include but are not limited to how user 102 interacted, e.g. by clicks or entering text, whether the interaction successful or failure, when was interaction served, and when did user 102 respond, etc. Thus, such data or analytics generated using such data may be sent to ad network 110 for storage and/or post-processing.

Interactive Multimedia Object Capable of Turning on and Off for the HIP (Human Interaction Proof) Features Websites use several workflows to achieve a task. Some examples include but are not limited to a user tries to register on a website; a user tries to perform an ecommerce transaction on a website; a user tries to login to a protected website such as a bank. All such events may require several layers of protection from malicious bots, scripts, and computer programs. To address these concerns, there are generally several levels of security, one of them being determination of HIP. An embodiment herein uses MMOs for HIP determination and builds interactivity around such MMOs to identify human traffic.

In an embodiment, a multimedia object server (MMOS) may use an MMO and control the way of serving an MMO in a web-based workflow, described in further detail below. In an embodiment, interactive capability of an MMO may be randomized based on the user behavior and may be turned ON or OFF based on different stages in the workflow.

Figure 2:
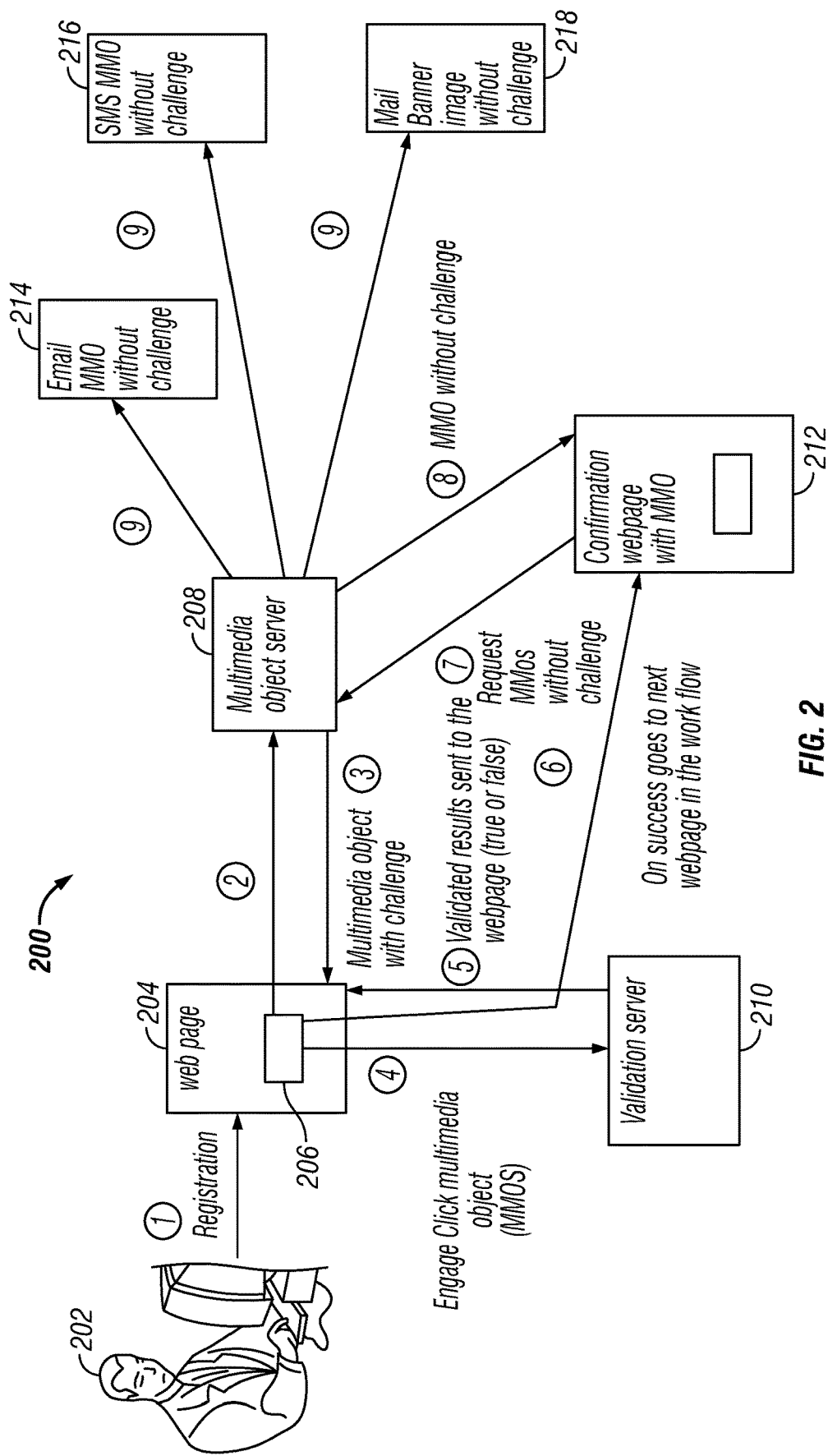
FIG. 2 is a high level architecture and message flow diagram, according to an embodiment.

The interactive capability of an MMO may also be used as a predetermined behavior in the workflow. An example using an MMO as a predetermined behavior in the workflow is described below with reference to FIG. 2. FIG. 2 is a high level architecture and message flow diagram 200 used in an example registration workflow process, according to an embodiment.

1. A user 202 visits a website at a webpage 204 which has a web-based workflow with several steps to accomplish a task. Such tasks may include but are not limited to registration, purchasing a product, adding user created content to existing content, and so forth.

2. Webpage 204 which involves the workflow is served to user 202 by a publisher, i.e. website.

3. Webpage 204 has an object 206 which is a widget, i.e. container of HIP enabled MMOs, calls a multimedia object server (MMOS) 208 to fetch a multimedia object, e.g. an image, video, texts, or audio. Optionally, sent with such call to MMOS 208 are additional attributes such as but not limited to website details, user demographic details, behavioral pattern of user 202, and the like. An additional attribute may also be sent where such attribute is related to whether user interaction from the MMO is required.

4. MMOS 208 parses the attributes sent by webpage 204 and fetches a relevant MMO from MMO storage server which fits the requirements sent in by the webpage 204 such as attributes of MMOs, interactivity types (click, drag, draw, write, listen, etc.) and HIP switch (turned on or off.) When the attribute which defines the interactivity requirement for Human interaction proof (HIP) is ON, the MMO is sent to webpage 204 from MMOS 208 with a challenge created by the system to verify the response of user. It should be appreciated that such MMO storage server may be but is not limited to local storage, shared storage in a network, remote storage of MMOs on a cloud, or remote storage from a private network of another entity, or a public network.

4a. When the MMO with HIP is requested, webpage 204 displays the MMO with the challenge. Webpage 204 also has placeholder attributes for capturing the user response. Examples of such user responses may include but are not limited to text entered as a response, attributes of a click, co-ordinates of a drag and drop action on the MMO, response from haptic technology on supporting devices, touch and tactile sensors on supporting devices such as for example touch-screen monitors, computers, smart-phones, and game consoles, and so forth.

4b. User 202 interacts with the MMO as described above. The placeholder attributes capture the interaction and are sent to a Validation Server (VS) 210 as response attributes.

4c. Validation Server (VS) 210 validates the response attributes to the challenge served for the MMO and verifies with one or more datasets for a possible match. The verification server process will use algorithms to fetch the datasets which are used to compare the response result with the expected stored result.

When a challenge is created, the datasets for the expected response are also stored. When a user response arrives, the stored datasets are compared with the user response.

4d1. When the attributes of the response satisfy the challenge, i.e. a match has been found, a success message is sent from VS 210 to webpage 204.

4d2. On success, webpage 204 moves control to a different webpage 212, which may be the next step in the workflow. Example different webpages 212 may include but are not limited to a confirmation page in registration, a confirmation page on a successful purchase, and a confirmation page which displays successful addition of content to existing content.

4d3. Confirmation page 212 requests from MMOS 208 for the same or related MMO without a challenge.

It should be appreciated that in an embodiment where a task has multiple steps, a user may interact with the MMO in one of the steps, but the same MMO may be shown in other steps without requiring user interaction. For example, when the MMO contains an advertisement, showing the same MMO at different stages of a workflow may be beneficial to the advertising company.

4d4. MMOS 208 serves confirmation page 212 the same or related MMO without a challenge and a parameter to specify that no response is expected.

4d5. Different webpage 212 serves MMOS 208 without the challenge. In this case, the workflow does not require any more HIP enabled MMOs in these webpages. However, it may be useful to serve the same MMO on such webpages. For example, it is appreciated that presenting the same (or, in similar context) MMO with which the user interacted recently provides higher probability for increased MMO recall and deeper MMO impression in user's mind. Statistics related to serving the MMO are sent back to MMOS 208, which are captured in a Status Server Module (SUS) (not shown). This can be stored in a database or any files. This module can be independently active or can be integrated with MMOS.

4d6. SUS also captures important statistics such as what was served, where was it served, IP address, webpage URL and user's alternate communication channels, e.g. email address, phone number, mailing address, printer address of user if submitted in any step on the workflow.

For example, MMOS 208 may send communications with MMO to an email server in an email MMO without challenge 214. Similarly, MMOS 208 may send an SMS MMO without challenge 216 and may send a mail banner image without challenge 218. It should be appreciated that the foregoing are by way of example only and are not meant to be limited. MMOS 208 may send any type of communication with an MMO without challenge in a wide variety of formats to a wide range of communication devices.

4d7. MMOS 208 updates the SUS with the statistics sent as per 4d6 and when any alternate communication details were provided, MMOS 208 sends the same or related MMO for the alternate communication mechanism.

4d8. MMOS 208 updates the SUS with additional details of what was served and alternate communication channel.

4e1. In the case when the user response does not satisfy the challenge posed, VS 210 sends a failure notification to webpage 204 and updates the SUS with the failed statistics.

4e2. Webpage 212 indicates failure to user 202 and sends a request for a new MMO with challenge to MMOS 208 when the threshold for allowable failures is still unreached.

4e3. Step 4 repeats all the way until success or until the number of failures threshold is reached by website 204.

Interactive Multimedia Object with Text Based Phrase Helpful in Financial and Marketing Campaigns In an embodiment, an interactive multimedia object with a text based phrase may be helpful in financial and marketing campaigns. Examples of such MMOs may include but are not limited to direct coupon codes, incremental reward based campaigns, and the like.

The MMOs used to isolate malicious bots on websites have various methods of security to distinguish human traffic, known as HIP. One of the methods used is a MMO with challenges in the form of characters which needs to be recognized, e.g. audio, video, or text based type-in formats. Such random characters or challenges may be a part of a financial transaction such as coupon codes, or reward points. A Coupon Code Module (CCM), which contains coupon codes, is provided which presents such challenges and receives the responses by the users. Such CCM module can be connected to MMOS where the coupon codes can be fetched and converted as a challenge to the user. The coupon code can also appear as the marketing material but the actual challenge for HIP can be different.

Figure 4:
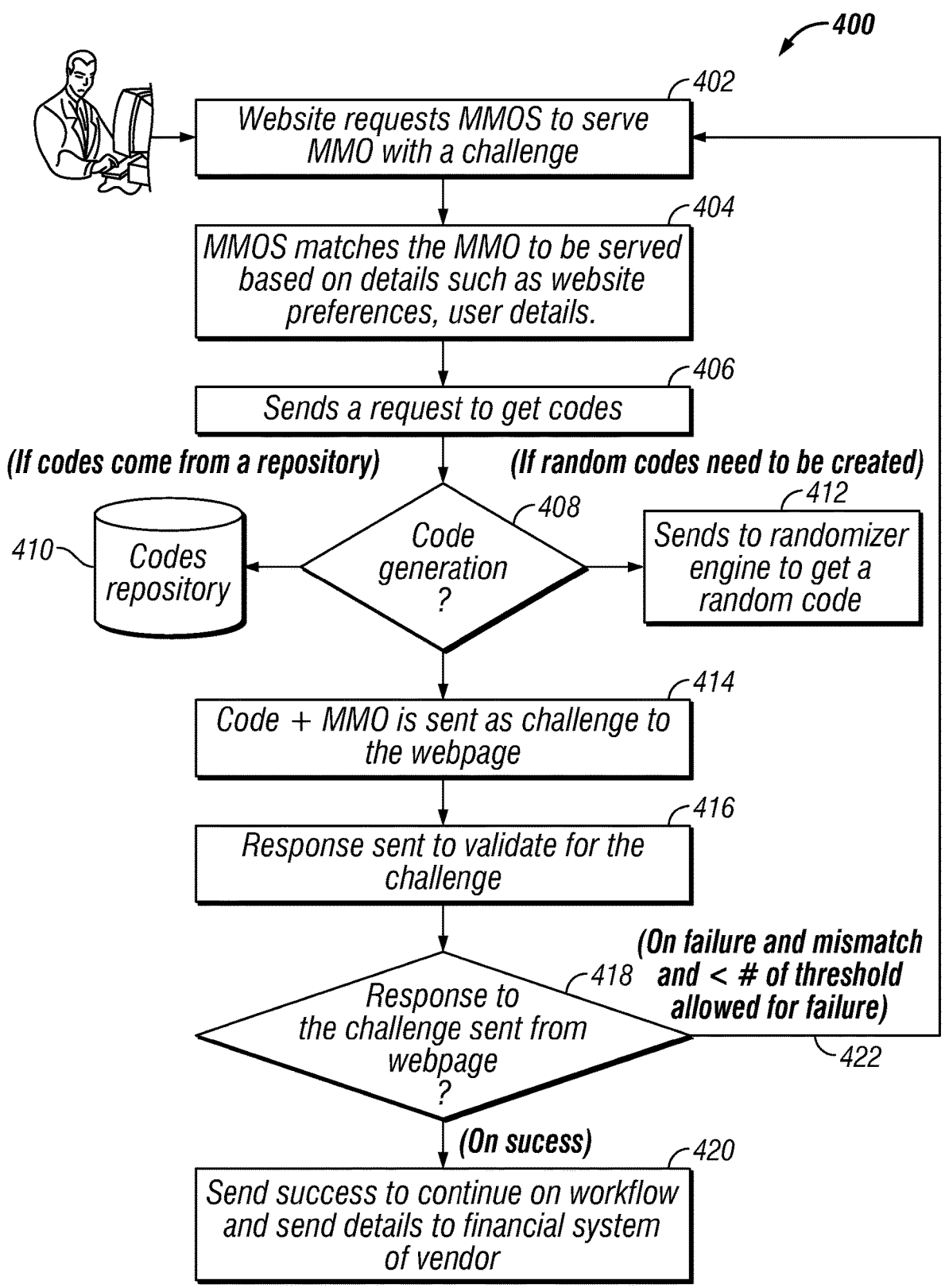
FIG. 4 is a flow diagram for using interactive multimedia objects with HIP capabilities as part of a financial transaction involving coupon codes or rewards points, according to an embodiment.

In an embodiment, a response ties the user to a financial reward system such as coupons, or reward points. An embodiment of using CCM is described hereinbelow with reference to FIG. 4, a flow diagram for using interactive multimedia objects with HIP capabilities as part of a financial transaction involving coupon codes or rewards points 400.

1. A user goes to a website which is serving MMOs as provided by embodiments herein.

2. The webpage calls the MMOS to fetch a MMO with a challenge (402). Examples of such MMOs includes but are not limited to an image, video or audio with additional attributes sent to MMOS such as website details, user demographic details, and behavioral pattern of the user, if any. An additional attribute is also sent regarding the need of any user interaction with the MMO. When the intent is to use the MMO as an advertisement campaign, an attribute is passed as a request for codes which is used in a financial transaction, e.g. but not limited to discount codes, coupon codes, and reward points.

3. The MMOS parses the details sent by the publisher's webpage and fetches the relevant multimedia object (MMO) which fits the requirements sent in by the webpage (404). When the attribute which defines the interactivity requirement for Human interaction proof (HIP) is ON and when one of the attribute requested is a code which needs to have interaction with the financial system, the MMOS will request a code from the Coupon Code module (CCM) for the corresponding MMO (406).

4. A code generation decision is made (408). When the MMO is associated with creating random coupon codes, then a randomizer module creates a code and sends it back to the MMO (412). If not, a preset code from the coupons/discount codes or rewards associated to the MMO is passed to the MMOS (410).

5s1. When the MMO with HIP and coupon code is requested, the webpage displays the MMO with the coupon code as the challenge in a HIP form (414) for example as type-in, video, and audio, and has a placeholder attribute to capture the user response. Examples of such user response include but are not limited to text entered as a response, attributes of a click, co-ordinates of the drag and drop action on the MMO, response from haptic technology on supporting devices, touch and tactile sensors on supporting devices, and so on.

5s2. The user interacts with the MMO and the interaction attributes, e.g. text entered as a response, attributes of a click, co-ordinates of the drag and drop action on the MMO, haptic technology on supporting devices, touch and tactile sensors on supporting devices like touch-screen monitors, computers, smart-phones, and game consoles, are sent to the validation server (VS) (416).

5s3. The Validation Server (VS) validates the response attributes to the challenge served for the MMO and verifies with the dataset for a possible match (418).

5d. When the response satisfies with the challenge, a success message is sent to the webpage by the MMOS (420) and statistics about the request, e.g. the timestamp, website which requested, user details if exists, and IP address, are sent to the CCM.

5s4. CCM persists the data and sends information to the coupon and rewards advertiser in a digital format (420).

5e1. When the response does not fulfill the challenge posed, VS sends failure to the webpage and updates the SUS with the failed status 5e2. The webpage indicates failure to the user and sends a request for a new MMO with a challenge to the MMOS (422), when the threshold for allowable failures is still unreached.

5e3. Step 4 repeats until success or the number of failures threshold is reached by the website.

User Defined Personal HIPS

In an embodiment, a user may choose his or her own MMO as his or her security mechanism. Examples of such MMOs include but are not limited to images, audio files, and video files with user created metadata information. Examples of such user created metadata information include but are not limited to tags, e.g. on or off, personal photos, words mentioned in audio files, tagged information, and subtitles in video files.

In an embodiment, the user uploads such metadata to a Multimedia Object Admin Server (MMOAS) and specifies any metadata associated with the MMO. MMOAS server handles metadata for MMOS to provide additional information which might be needed to serve an HIP challenge to the user. This information may include but are not limited to demographic, personal accounts of users, gender, age, or behavioral. Based on the webpage requirement set by user or publishers, the MMOAS server keeps track and provides and processes necessary metadata to create an optimal HIP challenge for a particular user on a particular webpage.

The MMOAS stores such metadata which MMOS may use on webpages where the user's identity needs to be validated. For example, if the website publisher prefers to use the user-defined HIPs as a security mechanism anytime the user visits the website, the user-defined HIP associated with the user along with the challenge is served to which the user needs to respond. In this case, user-defined HIP can be a personal picture where the user defines challenges such as for example "Click on your best friend in this picture" to a particular area in the image. This particular HIP can be sent to the user when the request comes from that user. The expected user response is to click on the mapped area on the image.

It should be appreciated that in an embodiment, the operational aspect for achieving HIP with interactive multimedia objects is similar to the operational aspects described herein above with reference to any of FIG. 2, for example.

User Defined Personal Interactive Multimedia Objects with HIP Capabilities

An embodiment provides user defined personal interactive multimedia objects with HIP capabilities. Extension may be added to split the response for a challenge which can be sent to the user via various communication mechanisms, e.g. the user needs to respond to some area on an image as asked in the HIP challenge and then type in some code which the user receives in his cell phone. The MMOAS server identifies the request for HIP challenge from a user and provides necessary information and communication methods to send the HIP challenge information in different ways, e.g. in this case, text on computer screen and a code in text message on cell phone. The validation server interacts with MMOAS to validate the user response when arrives.

In the embodiment, the user may choose his personal MMO as his security mechanism. For example, the user may choose an image, audio file, or video file with user created metadata information, such as but not limited to tags on personal photos, words mentioned in audio files, tagged information, and subtitles in video files. This is similar to specifying the secret questions and answers for security purposes, wherein the secret questions and answers that users chooses are correlated with the MMOs the user chooses.

In an embodiment, the user uploads metadata information to the MMOAS and specifies any metadata associated with the MMO. For example, the user uploads a picture and necessary metadata such as challenge texts ("who is your uncle?", "which street you met your spouse") and specifies interaction area on the image, which are the valid area for the challenge. The user can also provide interaction types such as click, draw, or type using the challenge user describes. HIP challenge may have the corresponding interaction capability. In addition, the user chooses multiple alternate communication mechanisms in case he is finding difficulty in responding to certain HIP challenges. For example, a user can let the system know that the alternate communication mechanism is text message for typing in some code as a response for the challenge posed. In this case, the challenge posed for the user may be a text box to type-in the code he receives in the cell phone. In addition there might be more interaction challenges for the users to resolve apart from writing down the code received via cellular text mechanism. In other example, the user can get a ring from the MMOAS server which may ask the user to perform certain actions using keys on the phone to verify the code or listen to the code and write it down on the HIP challenge area for validation. HIP challenges in the herein described cases may appear at any device where HIP needs to be performed. Examples may include but are not limited to computer screens, Smartphones, cellular phones, tablets, and other devices capable to make interaction with users.

Interactive Multimedia Objects for NFC, RFID Based Devices

An embodiment provides MMOs for near field communications (NFC) and radio-frequency identification (RFID)-based devices with HIP capabilities. NFC based devices are becoming prevalent amongst the new generation of smartphones and eCommerce involving these devices are gaining momentum. Thus, an additional level of security and building secure, interactive multimedia objects in combination with NFC capabilities are needed. An example may include but is not limited to a user trying to authenticate with a financial institution. Such user may have to interact with a multimedia object using a NFC device, e.g. tapping a NFC capable phone with a target device to transfer data or using NFC capabilities of touch, tap to proceed in an Internet based workflow, e.g. login, authentication, purchase of a product, or add content.

As an example, in an embodiment a user goes to his website to initiate a financial transaction. The authentication servers serve an interactive MMO on NFC capable devices with a challenge. For example a user may have a predefined picture/s of his family with tags associated to the image/s which may be used as security questions to identify him. Also the user's profile may be associated to an NFC capable device such as his NFC enabled smartphone. Now the challenge sent may be tap/click on a wife's image in the picture shown AND also tap the phone onto another NFC device, provided by the security provider to make sure the answer is coming from the right user profile AND from the right device. The user responds to the MMO using touch or tap onto another target NFC device, such as but not limited to NFC enabled smartphones to validate the HIP challenge and send a response to the validation servers. The validation servers authenticate the response and send the results, such as success, if someone answered the challenge right and also from the right registered NFC enabled device to the NFC enabled smartphone to complete the transaction.

Examples may include but are not limited to:

A user registers with a financial transaction.

As part of the signup, the financial institution asks him to create his user information, password, associate a phone number of his personal phone which is NFC enabled.

Also the signup process insists on uploading a personal picture. Once the picture is uploaded, the website may provide capabilities to create hotspots on the image and associate challenges and responses in the form of tags, e.g. polygon co-ordinates x1,y1 x2,y2 . . . xn,yn define the user's wife face, using any standard image editing software. The image, challenges and valid responses may be stored as part of the user's profile.

Next when the user wants to complete a transaction in a store, the bank sends the image with a challenge to be responded and also with a request to touch or bring it close to the NFC reader.

Once the challenge is responded AND also brought close to the NFC reader, if the challenge was responded right, the transaction completes successfully. If either of them is incorrect it would fail, until the threshold of tolerated failures by the institution is reached, after which the profile may get blocked or locked.

Challenge and Response Outside the MMO

In an embodiment, the challenge question is presented outside the MMO as well as a response field, such as a text box in which to type in the answer, is outside the MMO. A MMO may have a predefined set of challenges and valid responses created and associated with it. For example, on an image showing a family, there could be challenges created such as "how many people are in the family" the valid response of which may be "five" AND "what is the hair color of the person who is on the right corner" which may be "black". Now when this challenge is shown to a user for serving HIP, the image may be sent by the system. The challenge question may be outside the image and an input field would be outside the image. An extension to this may also be a standard question of "how many people are in the picture" could always be shown on a website using this for HIP and all images served would be of a group of people. The response to this question also may be outside the image. In an embodiment, an MMO may have one or more questions associated with it and a question may have one or more responses associated with it. These would be ideally tags for a question and would be provided by the content owner.

Morphed Interactive MMO—Challenge Inside the MMO and Response Outside the MMO In an embodiment, a challenge is in the MMO itself and is presented inside the MMO. The response, such as a text box to receive the inputted response may be outside the MMO. In an embodiment, an MMO may have one or more questions associated with it and a question may have one or more responses associated with it. These would be ideally tags for a question and would be provided by the content owner For example, an MMO may have a predefined set of challenges and valid responses created and associated with it. For example, on an image showing a family, there may be challenges created such as "how many people are in the family" the valid response of which may be "five" AND "what is the hair color of the person who is on the right corner" which may be "black". Now when this challenge is shown to a user for serving HIP, the challenge question may be watermarked or inserted using any image editing software, on the image and the watermarked image is served. The response to the question which is watermarked may be answered outside the image on an independent textbox or input box.

Advanced MMO—Challenge and Message Inside the MMO and Response Outside the MMO In an embodiment, a MMO may have the message about the MMO and the challenge questions presented in CAPTCHA form for HIP capabilities. This is needed for use cases such as identifying traffic from humans and filtering bots; identifying whether a specific user/profile is used as a security mechanism. The response, such as a text box to receive the inputted response, may be outside the MMO. In an embodiment, an MMO may have one or more questions associated with it and a question may have one or more responses associated with it. These would be ideally tags for a question and would be provided by the content owner.

Figure 10:
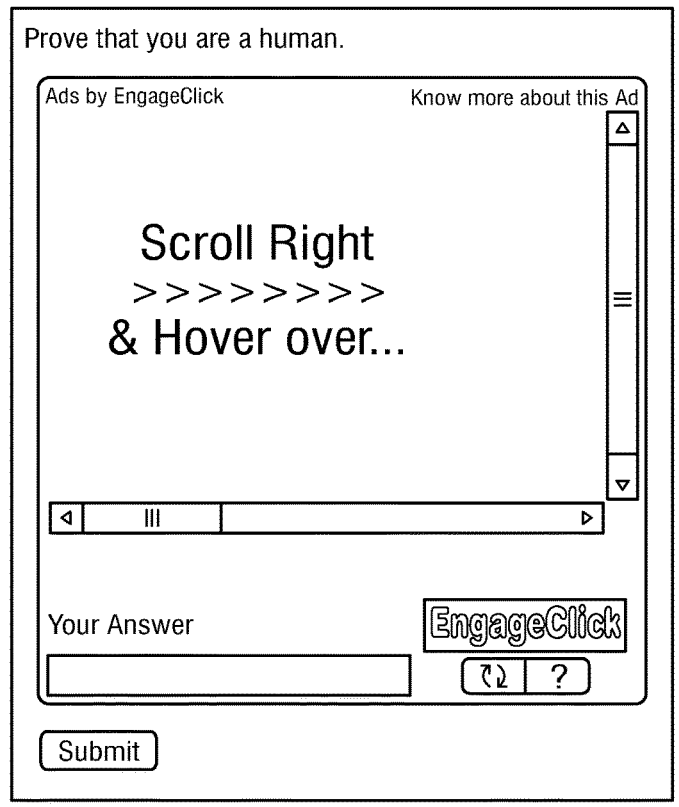
FIG. 10 is a sample screenshot of a multimedia object with HIP capabilities, instructing the user to scroll right and hover over the image, according to an embodiment.
Figure 11:
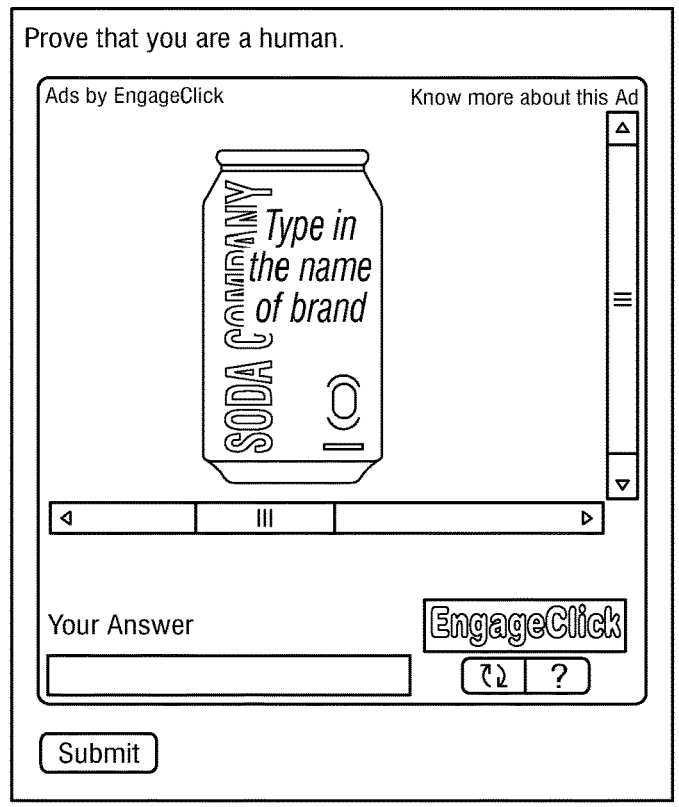
FIG. 11 is a sample screenshot of the image of FIG. 10 after the user scrolled over to the right, according to an embodiment.

FIG. 10 illustrates a sample of how the widget may look like to start. Then, interacting with the MMO presented may lead the widget to look like the can of soda as depicted in FIG. 11. An action may include after scrolling right, hovering over the image for the next task, which is on a mouse over. In such example, the challenge is along with the MMO and the text to be answered may be displayed in the image also. In this example, the answer textbox is outside the image.

Methods to Detect Misuse of Interactive Multimedia Objects and Resolve it

Multimedia objects (MMOs) may be misused in various ways. Humans or bots (or non-human) can interact with the MMOs to earn revenue and misuse online services. Multimedia objects may be directed to third parties to interact with the media objects for resolving human proof challenges, as a malicious human farm, i.e. a set of people who keep resolving HIP challenge as it keeps coming.

Figure 5:
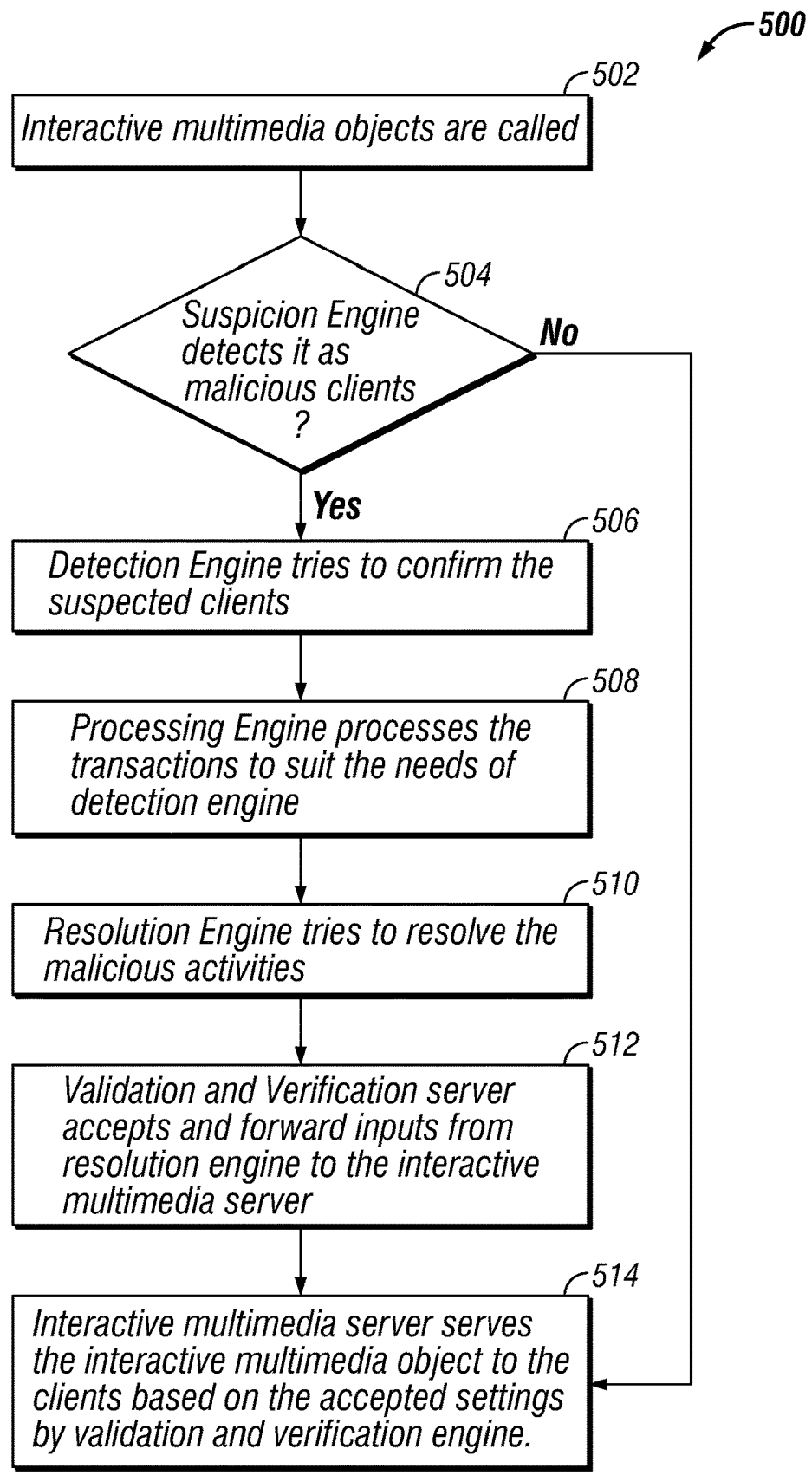
FIG. 5 is a flow diagram of for suspecting to validating multimedia objects, according to an embodiment.

Embodiments herein provide various methods to handle such misuses from malicious human farms. One embodiment can be understood with reference to FIG. 5, a flow diagram 500 for suspecting to validating MMOs. These methods comprise of components including but not limited to suspicion engines, detection engines, processing engines, and resolution engines. These components may be attached to the database, i.e. datasets for the user traffic records, for gathering previous records and interact with other servers such MMOS and MMOAS in various stages of interactions. Suspicion engines detect suspicious activities by monitoring active and passive transactions of the MMOs. Such transactions comprise of Internet Protocol (IP) addresses, sessions, information of challenges and responses, or interaction methods to name a few. The suspicion engine uses historical data from the databases where all the MMO transactions are stored, to interpret such transactions of the MMOs. In the embodiment, at step 502, a MMO is requested by a webpage or other applications which requires MMO. The above-described suspicion engine determines whether the MMO is malicious at step 504 based on the transactions of the MMO. The client in the flow diagram is the webpage or any other software or device application where user needs to interact with MMO. The detection engines have a predetermined set of detection rules and are designed to optimize the suspected transactions of the MMOs. These rules may be statically created based on the incremental information found about non-human traffic behavior such as User agents in the IP headers, IP addresses, etc. Or, these rules may be attached to the AI component which uses machine learning algorithms to develop a classification and recognition model to detect the incoming traffic and classify them into various levels of suspicion buckets, such as very suspicious, low suspicious, fatal, etc. The detection engines monitor the suspected transactions for any violation of the predetermined rules. Thus, in the embodiment, at step 506, the detection engine tries to confirm whether the user on the client, e.g. webpage or any other application or device, is suspicious based on the suspected transactions. Responsive to the detection engine finding a violation, e.g. a transaction violated a given rule, control is passed to a processing engine, which processes several sets of data from the transaction record datasets for all the MMOs to detect the malicious bots or human farm activities. It also prepares information for processing engine which to take certain actions and measures to reduce the impact of these bot or human farm attacks. For example, if the system can slow down the response rate of the HIP MMOs, the impact on the mis-utilization of webpage resources might also get slowed down. Thus, at step 508, the processing engine processes the transactions to suit the needs of the detection engine. For example, minimizing the impact may include but is not limited to: nullifying the previous transactions, informing stakeholders associated with such suspicious activities, (for example, very high rate of response and refresh rate of MMO requests to MMOS), and updating the predetermined set of detection rules (for example, adding suspicious IP addresses, user agents of HTTP headers). At step 510 the resolution engine attempts to resolve the malicious activities. Examples may include but are not limited to blocking such transactions, mitigating the risks by increasing difficulty of the challenges associated with the MMOs, and forcing the increased time session of such MMOs. At step 512, the validation and verification server accepts and forwards inputs from the resolution engine to the MMOS for further processing to fetch the most suitable MMO based on the information it receives from all other above mentioned interacting components. At step 514, the MMOS serves the MMO to the clients.

When at step 504 the suspicion engine does not detect the transaction of the MMO as being suspicious, control passes to step 514.

Other components may help in many ways to accomplish the above tasks such as setting values for the communication methods by consulting with other components, generate reports for such malicious activities, provide analysis of interactive multimedia objects which are more prone to such threats, and measure temporal and spatial malicious activities across various parameters such as demography, geo-location, and timings.

Automatic HIP Generation by Methods which are Random in Nature and Independent of Multimedia Object It has been found that scalability may be an issue with the Human Interaction Proof technologies. Frequently, alphanumeric characters are used to bring randomness in the HIP technologies but even those are not quite enough. Several bots may be intelligent enough to detect characters even when noises are inserted by converting the characters to a distorted image.

An embodiment provides a HIP generation component configured to mitigate the scalability issues of coming up with challenges which are very randomistic and unpredictable for the bots or any malicious scripts to be written. The embodiment provides automated random schemes that may be mapped with several interaction techniques of high scalability to optimize the MMOs. Such automated random schemes save a lot of human effort and makes the HIP generation process easy, dynamic, and in real time.

Following are example processes in accordance with an embodiment.

- Use a randomization method to generate a random or a fixed number of random co-ordinates, sets of random objects, random colors of these objects and random orientation in the images. These are randomized to increase the strength of this component.
- Random interaction techniques may be selected by the process serving the images (MMOS) based on the request from the widget such as connecting the objects at the randomly chosen co-ordinates by dragging, clicking on the objects at the above chosen co-ordinates, and merging the objects on the above chosen random co-ordinates.
- The objects at the randomly chosen co-ordinates may be randomized with colors, images, or other interactive multimedia.
- The sequence of the interaction of the randomly chosen objects may be randomized such as dragging a red object to blue, clicking on a purple object, dragging a milk bottle to a child, or dragging the child to the milk bottle.
- These randomly chosen objects can be created independent of the interactive multimedia objects.

Figure 6:
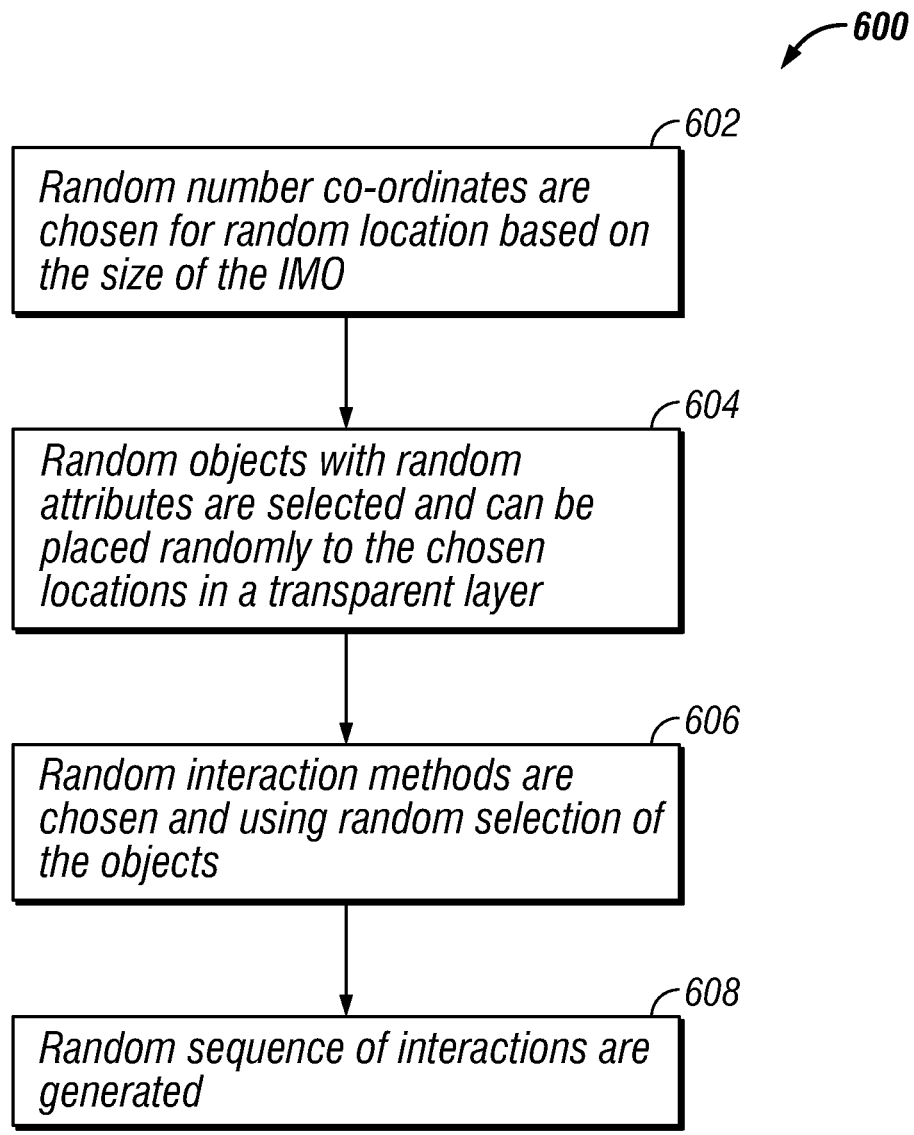
FIG. 6 is a flow diagram of HIP generation generating random attributes; according to an embodiment.

One embodiment can be understood with reference to FIG. 6, a flow diagram of HIP generation generating random attributes. At step 602, a random number of co-ordinates are chosen for random locations based on the size of the MMO. At step 604, random objects with random attributes are selected and are placed randomly to the chosen locations in a transparent layer. At step 606, random interaction methods are chosen and a random selection of the objects is used. At step 608, a random sequence of interactions is generated.

Figure 12:
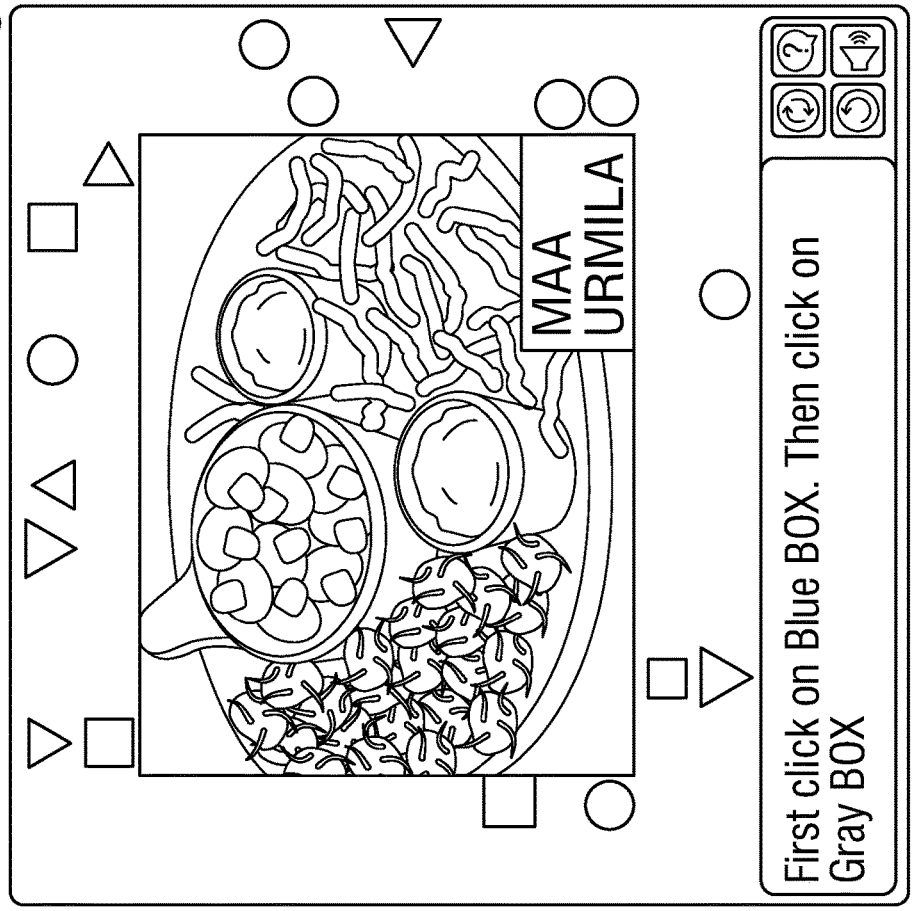
FIG. 12 is a sample screenshot of a multimedia object with HIP capabilities, asking the user to read the challenge, solve, and submit to verify, according to an embodiment.

For example, when a request to MMOS to serve up an image happens, it may pick the image based on the request and work with the image libraries to come up with random objects, random colors, random orientation, and random co-ordinates. The resultant image library output may create additional images which may be stitched along with the main image and served to the client. A sample illustration of how it would look like is shown in FIG. 12.

In the example above, when a request comes for the image from "Maa Urmila", the MMOS pick the image and based on the request, create objects, colors, co-ordinates and orientation randomly and stitch around the image, all the sides or any side.

An embodiment provides a transparent layer of such random objects that can be dynamically stitched with the background multimedia objects. These transparent layers of objects may be location independent and may not be on top of interactive multimedia objects.

As another example, a request comes to MMOS to serve an image. The image has a picture of a car. In this scenario MMOS may draw an image of an envelope on the top of the image using any standard image processing library, stitch the two images and serve it. On the client side the challenge asked may be "please open the envelope and click/tap on the car shown".

Another example is as follows. The MMOS serves the same image with an envelope image stitched and served. The challenge may be shake the smartphone, use the accelerometer to detect the action, clear the envelope and show the image.

Human Interaction Proof Technology for Small Screen Devices Such as Mobile Phones and Tablets—Motion Based, Gravity Based, Geo-Location Based, Direction Based An embodiment uses Human Interaction Proof technology for small screen devices such as mobile phones and tablets by techniques which includes but are not limited to motion based, gravity based, geo-location based, and direction based. Today various small screen devices such as mobile phones and tablets face a lot of challenges in terms of solving HIP techniques. Some of the current challenges include difficulties for a human to remember and type the unwieldy characters into the small screen and to see small characters and increased chances of typing in wrong characters. All such challenges increase the problem for a user to interact with the HIP technologies causing frustration and disloyalty with the services.

Figure 13:
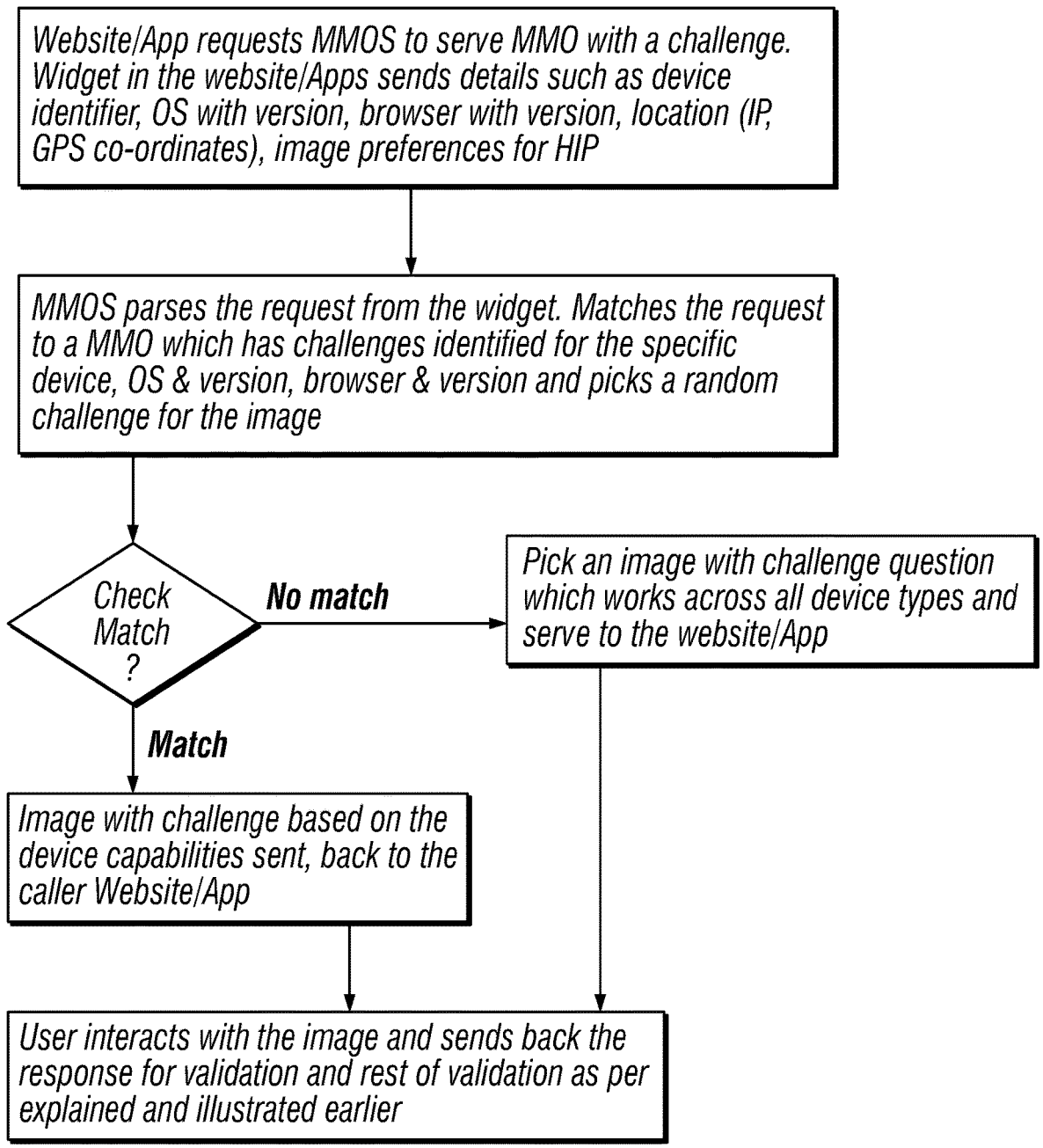
FIG. 13 is a flow diagram for providing an Image with a challenge based on device capabilities, according to an embodiment.

Embodiments herein provide a unique and easy way of providing HIP technologies to the users. Such techniques, when applicable, may be deployed on any type of a device that uses the HIP technologies. Rules may be developed for mapping a set of particular HIPs to a set of particular devices. Such mapping or relations may be single or multiple. For example, a phone which has accelerometer capabilities may have challenges associated to the use of accelerometer. An image may be split/distorted when serving. The challenge posed to the user may be to shake the phone to straighten the image. A phone which does not have any haptic technology enablement may have challenges in the form of a text or SMS message may be sent with the challenge. The answer to that may be sent as a reply or the challenge may be sent in the form of an audio file as part of a SMS and the response may be sent back in the form of a SMS after listening to the audio file. It should be appreciated that the challenges for HIP may be dependent on the capabilities of the phone. FIG. 13 depicts the flowchart showing how a MMO may be chosen based on the parameters sent by the widget.

Some techniques in accordance with embodiments herein include but are not limited to the following:

Motion based HIP—Devices can be moved along certain direction or can be moved around multiple directions to resolve challenges posed by the HIPs. For example, the HIP can ask the user to displace the device from one location to other.

Gravity based HIP—Devices can detect gravitational strength by moving it down or up and such input can be used to resolve challenges posed by the HIPs. For example, the HIP can ask the user to move the device in upward or downward direction from its current position.

Spinning the device—Users can be asked to spin the device in certain directions or in zigzag fashion or in any other ways to resolve challenges posed by the HIPs. For example, the HIP can ask the user to shake the device or it can also ask the user to rotate the device in such a way that the interactive multimedia object changes its color to a different color.

Figure 7:
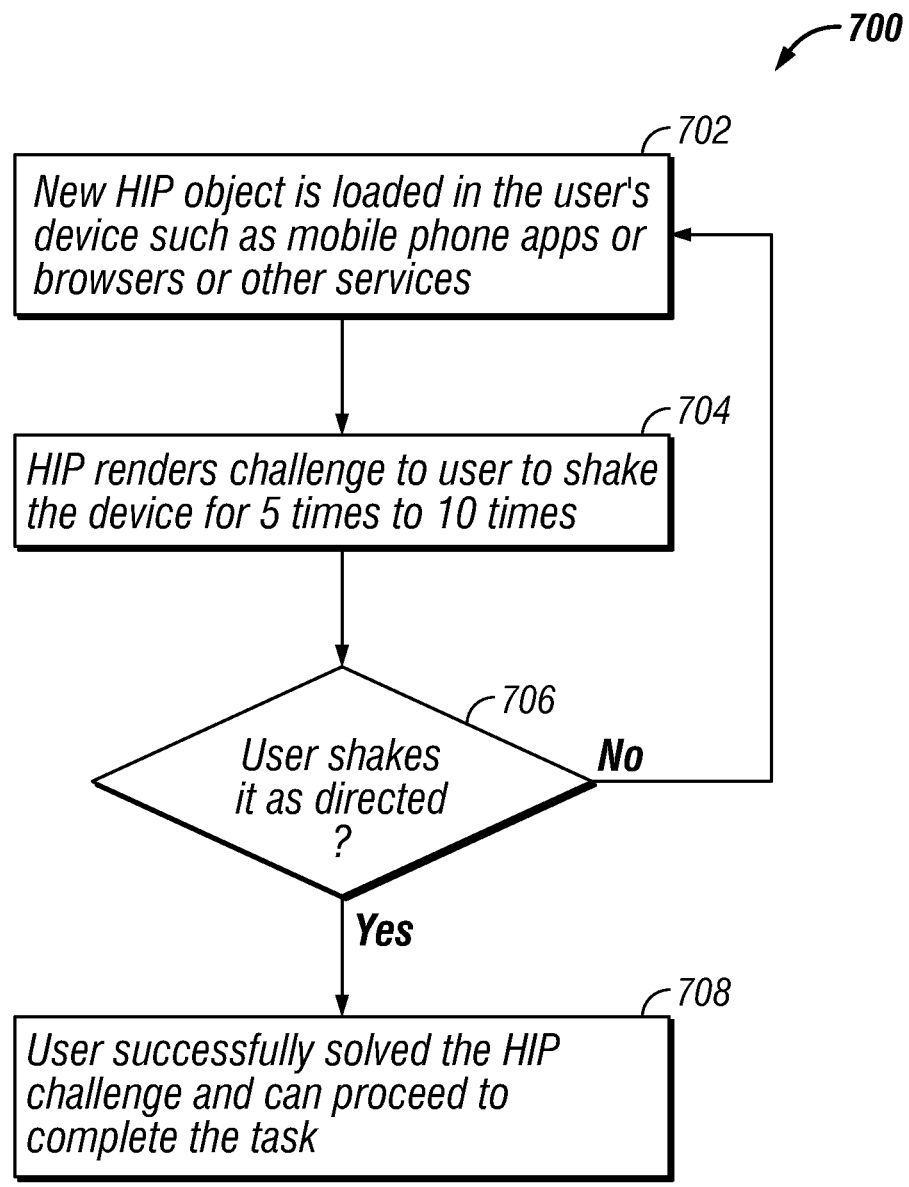
FIG. 7 is a flow diagram for a user to solve the HIP challenge successfully using shakes, according to an embodiment.

One embodiment can be understood with reference to FIG. 7, a flow diagram for a user to solve the HIP challenge successfully using shakes 700. At step 702, a new HIP object is loaded in the user's device such as a mobile phone application, browser, or other service. At step 704, HIP renders a challenge to the user to shake the device for 5 times to 10 times. At step 706, a processor determines whether the user shakes the device as instructed. When it is determined that the user did not shake the device as instructed, control returns to step 702. When it is determined that the user did shake the device as instructed, control goes to step 708, at which because the user successfully solved the HIP challenge, the user may proceed to complete the task at hand.

These techniques can also be used to make the MMOs useful for other applications. For instance, such techniques may be used to serve online advertisement in an interesting way to engage users. For example, in advertising an interactive MMO may be served as an advertisement in any workflow of the app/website/game. In a game when a user needs to go to different levels, the user may either buy virtual currency or real currency to achieve such or the user may interact with a high value ad on the phone to achieve it. A phone which has accelerometer capabilities may have an ad served. Such ad image may be distorted. The challenge served along with the ad to the user may be to shake the phone to straighten the image. Once the user shakes the device, the ad image straightens and the user is able to proceed to the next step in the workflow. Another example includes but is not limited to proving someone is not a bot. In such example, an ad may be served on a phone which supports haptic technology and the ad may have a misty look. The challenge asked for the user to prove he is not a bot may be to wipe on top of the ad and click/tap on the logo of the ad.

AI Based HIP Delivery

An embodiment provides artificial intelligence (AI) based HIP delivery. Even when the HIP is delivered to users, there are post-delivery issues that need to be addressed for ensuring a bot-free interactive session. In most of the cases, the existing HIP systems provide either no or somewhat naive support of such concerns. Generally, the existing systems provide easier HIP objects to the user when the user failed to resolve the earlier HIP objects. However, such types of HIP systems may be prone to the bots.

To resolve this concern, an embodiment provides an AI component, attached to the datasets created from the various MMO transactions, that tracks various parameters of a MMO transactions (flows of interactions with or without HIP), use the attached datasets, train the AI and machine learning component using the attached datasets, and collaborate with other components such as suspicion engine, detection engine, processing engine, resolution engine, and other components of validation and verification engines. Such AI component may also communicate with a MMOS and MMOAS. Some of the embodiments incorporating such features are as follows—

In an embodiment, AI component tracks and keep records of some of the most suspicious transactions of the HIP system. These records can be categorized by using temporal and spatial classification methods to detect if the records are suspicious, e.g. human vs. non-human transaction records. The suspicious data may be generated to see the growth of such data within a specific duration of time, e.g. temporal classification, or from a demographic data, e.g. spatial classification. Spatial classification may be made using various other attributes such as IP addresses ZIP codes. When the information from spatial and temporal classifications is seen together, it provides deeper perspective of the suspicious user traffic. The same functions may be performed real-time using training datasets. For any new incoming user traffic, the classification may be performed in real-time to see if the user interaction falls into human or non-human categories. If user is suspected to be non-human, then a tougher HIP MMO challenge is passed back to the user. If the suspicion increases, toughness of the challenge and response method of the HIP MMO also increases. In an embodiment, such growth in toughness may be determined from any of linear, exponential, or other curves.

In an embodiment, when a trend is seen as going exponential, the system may not try to increase only the toughness of the HIP MMO challenges but may try to generate and pass to the user a very different type of HIP MMO challenge. For example, when a "click" type of interactions on the HIP MMO challenge seems to be providing a trend in increasing suspicious, the system may start using other interactions such as "drag" type. Various other attributes may also be changed to reduce the suspicious trend. As well, if a limited threshold is crossed, webpage owner may be informed by the system, in real-time, for such suspicious trends.

Conversely, in an embodiment, for a friendly user, the toughness of the challenge and response method for the HIP decreases to make it easy for the users.

The AI components learn through successfully solved cases and update their knowledge so that future similar situations can be addressed quickly.

Reward Based HIP System

An embodiment provides a reward based HIP system. Current HIP objects or MMOs do not provide a direct reward to the user for using it. Rather, if the HIP object frustrates users, the users might refrain from using the services where the HIP object appeared. Similarly, MMOs are also prone to such threats.

Thus, an embodiment provides a rewarding HIP system that has options to reward users in various ways, some of which were discussed hereinabove. Further example embodiments include but are not limited to:

Users who resolved the HIP objects in a predetermined amount of time, e.g. in the 2% of the minimum time taken by any users for such HIP objects are rewarded. An example includes but is not limited to certain discounts for some products or services. Alternatively, such users may receive reward points which can be redeemed later for products or services.

Coupons may be provided for a user who interacts with more objects of the MMOs. An example may include a mobile game and to cross levels in the game there is a provision to either buy using virtual or real currency or an interactive ad is served. If an interactive ad is requested, the MMOS may serve an interactive ad and record the time. When the interaction data comes back the duration for interaction is known. This is compared with historical data of how much time users took to solve the same interactive ad. If the current use has taken lesser time, the response of success is sent along with the duration to the calling game. The game developer may reward the user with a deeper discount for solving the challenge posed by the MMO quicker.

The provided system may award bonus points to the users who resolve HIP correctly, so that user may later translate the reward bonus points to some virtual or real benefits. The bonus points may be used to collect coupons, gift cards, bonus subscriptions, etc.

A Method to Share User Interactivity on the MMOS

An embodiment provides a system and method for sharing user interactivity on the MMOs. In today's digitally social world, people use social networking systems to share their life experiences and thoughts of the day such as for example, through tweets, posts on social networks, and uploading of photos. Currently, existing HIP systems do not provide any such mechanism enabling users to share such experiences with friends.

Thus, an embodiment provides a unique way for users to share experiences of the HIP objects or MMOs or both via social networks. For example, on a website registration form for HIP purpose an interactive MMO is served. The user interacts with such and submits the response. The response is received by the validation server and success or failure is sent back to the website. On the widget where the interactive MMO is served, there is a feedback mechanism which links to the social networking site's API, such as a "Like" button of Facebook for this specific MMO. The user may share his experience interacting with this MMO using the button on the widget. In the embodiment, users are able to share their experience via various social forums for example by sending a "like" for the interactive experience with the MMO or sending a tweet about the MMO from the widget. The widget may have the social networks API embedded. Experiences may be shared by other communication means as well such as but not limited to e-mail, SMS, and instant messages.

Further examples include but are not limited to:

Users solve an HIP object in less than 2 seconds and they stand in the 95th percentile of the people who resolved the same or similar HIP objects. They can share this winning experience via social networks and can challenge their friends to play one.

Users receive a coupon via MMO and they can share the coupon, if applicable, through the social network or they may communicate about it to their friends via other means such as texting on phone, e-mail, etc. for example, on a website registration form for HIP purpose an interactive MMO is served and a user session created by MMOS. The session data is sent to the widget as well as maintained in the MMOS database. The user interacts with the MMO on the widget and submits the response. The response is received by the validation server and success or failure is sent back to the website. The duration taken from the time the MMO was served and responded to, is stored in the database of MMOS along with the session data. The widget has buttons to various social forums such as Facebook and Twitter. When a user clicks on these social forum data, the session data maintained in the widget is sent to MMOs requesting for the duration and comparison data for duration taken by other sessions for this specific MMO. MMOS processes this data from the database and sends the duration taken for this session and the percentile distribution of where this duration compares with the remaining data, to the widget. The widget connects to the social forum API and passes this data along with the profile data of the user, e.g. when automatically logged in. If not logged in, the API may follow the specific social forum's login and publishing protocol to publish this data. Likewise, there may be buttons on the widget to email, text the results. On click of those buttons, the pertinent API interface to email, text, SMS may be invoked and the data transferred as part of the body to those communication channels.

Bookmark an MMO for Future Reference

An embodiment provides capability to bookmark an MMO for future reference. Many times users find an interesting MMO, and are willing to interact with it but do not interact with it for some reason. Consequently, they may lose track of such interesting MMOs. Thus, an embodiment provides a mechanism to bookmark such MMOs for future reference and subsequently access such bookmarked MMOs.

Users can access the bookmarked MMOs by various ways as follows. Users may create a personal account to keep track of various things such as reward points, coupons, and bookmarked MMOs. Users can also ask the system to e-mail such bookmarked MMOs to themselves or a social network, or to send the bookmarked MMOs as instant messages to mobile phones, or to store the bookmarked MMOs in the users' personal account. However, a time limitation for validity of these bookmarked MMOs may be introduced to limit the number of bookmarked MMOs and store only live MMOs. For example, on a website registration form for HIP purpose an interactive MMO is served and a user session is created by MMOS. The session data is sent to the widget as well as maintained in the MMOS database. The user interacts with the MMO on the widget and submits the response. The response is received by the validation server and success or failure is sent back to the website. The widget has a Bookmark button. If the user wants to bookmark the MMO for further interest such as wanting to buy a particular item later, the user clicks on the Bookmark button. The user is directed to a website. The MMO id which is stored in the session cookie is sent as a parameter with the session information to the website. The website provides an option to register the user or login when already registered and after signing in stores the MMO id, session information, including when and where, e.g. web URL, the MMO was served. The details are stored in the database and associated to the profile of the user signing in. This way the user has a repository of all interesting bookmarked HIP enabled MMOs.

For example, a user finds in an MMO an interesting offer on a pair of jeans to an unknown store but the user likes to visit the store and avail the offer. However, as the user is already in the process of doing something more important he/she tries to ignore the MMO at that instant. In such a case, the user is given an option to bookmark such MMO for future reference. Such bookmarking enables the user to return to his/her personal account or check the preferred communication system for details of the MMO at a later instant.

Voice Based HIPS

An embodiment provides voice based HIPs. Several prior art HIP systems provide an audio method to resolve the posed challenge. Such systems are helpful for a visibly challenged user. Such audio systems are unidirectional where a user can hear the challenge and respond by typing. However, these audio systems come with limitations. Difficulty for a user typing fast and increased typographical errors in volume-arrested devices or in small-sized display devices are just some of the problems associated with such audio based MMOs. Thus, to address the above mentioned problems, an embodiment provides a voice based HIP system with a bidirectional feature. In accordance with the embodiment, such HIP system can provide an audio based MMO challenge and accept an audio based response as well. A combination of the MMOs and the HIPs can be used. For example, the widget on a website requests the MMOS to provide an audio MMO. MMOS parses the request and finds a matching audio MMO which has a challenge in it and serves it back to the widget. The widget plays the audio file which may be anything such as "Listen to the audio advertisement and shake the phone to prove you are a human". The user responds back by shaking the smartphone. The accelerometer reading in the phone is sent back by the widget for validation to the validation server. The validation server compares the response associated to the audio challenge and sends success or failure back to the client.

Subscription Based HIPS for Advertiser Deals

An embodiment provides subscription-based HIPs for advertiser deals. The details and example are explained below. The embodiment provides a subscription component that enables a user to subscribe to similar types of MMOs and refer to such MMOs at a later time. A personal account can be created to manage reward points, subscription information, or other user information. As well, users can also subscribe to such MMOs via other communication systems such as SMS, e-mail, and instant messaging. For example, a user goes to the registration form of a website. For HIP purpose, there is an MMO with ad embedded in it, e.g. on a product ad, challenge may be "click/tap on the model in the image". When this is served on the widget, such as according to flows as described in earlier examples, by MMOS, the user in addition to responding gets an option to subscribe to the advertiser in the ad. This may be in the form of clicking a subscribe button in the widget next to the ad, which may say "subscribe to the advertiser here". When the subscribe button's clicked, the user is directed to a website. The MMO id which is stored in the session cookie is sent as a parameter with the session information to the website. The website provides an option to register the user or login when already registered and after signing in stores the MMO id, session information, including when and where, e.g. web URL, the MMO was served. The details are stored in the database and associated to the profile of the user signing in. Information collected in terms of user preferences for advertisers is used by MMOS to match ads when the next request from the user comes in. It may be on the same page or any other page where the widget calls the MMOS which has this information in the database. Now the same collected information may be shared and tied to the advertisers rewards system and the more the user interacts with the advertisers ads successfully, the user could be rewarded such as with points, recognitions, monetary benefits, discounts on transactions.

Redirection to Advertisement from HIP

Figure 14:
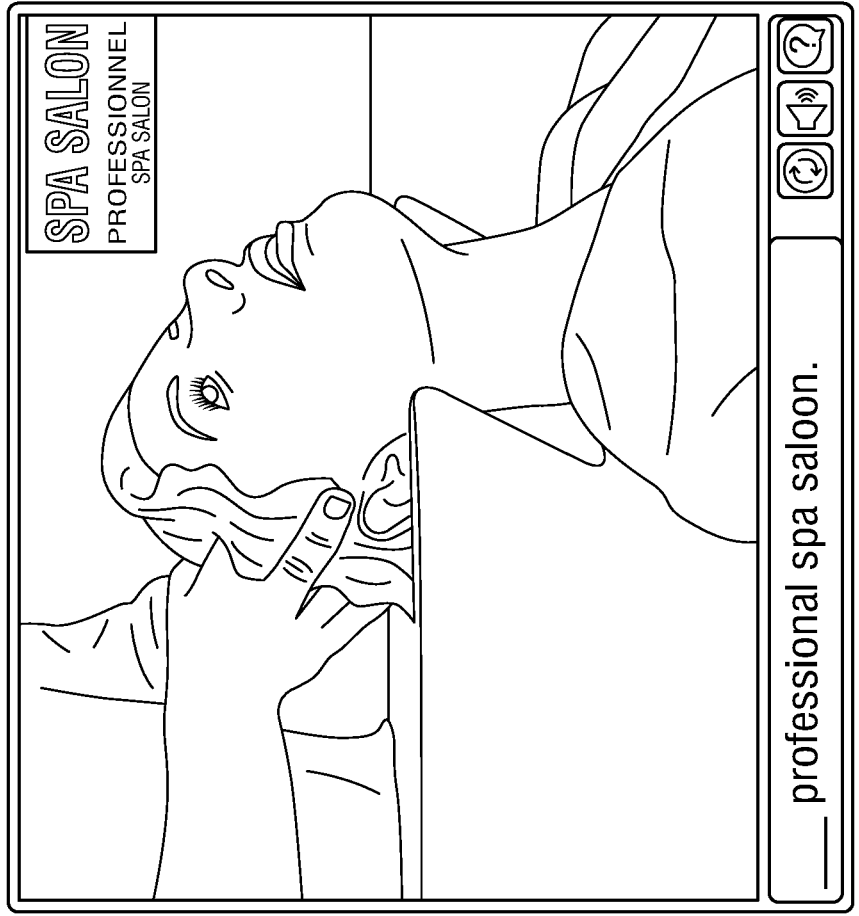
FIG. 14 is a sample screenshot showing an icon which when clicked by a user sends session statistics along with multimedia object informational data to the multimedia object server, according to an embodiment.

An embodiment is configured to let a user visit the details of the MMOs. For example, an MMO provider may provide a redirection link which may be provided to the user. Thus, when users are interested to find more details, such users can use the redirection link to visit to the location where they can find further details. Any such activities may be tracked by the widget and the call is sent to the MMOS which captures the statistics about the click, on which web URL was it clicked, when it was clicked, device, OS, browser and versions associated in the call. These analytics are captured in a database and reports of how many users clicked on "know more about this ad" may be generated by any reporting system which can connect to the database. These reports may be on demand and scheduled for auto-delivery based on the advertiser's and publisher's preferences. It should be appreciated that it may be useful to know which MMO which had HIP capability was interacted to understand more about the ad. FIG. 14 illustrates an example.

HIP Reporting

An embodiment provides a reporting mechanism which tracks the combinational parameters for the MMOs and HIP objects, for example including but not limited to: Engagement Tracking Report: Detailed breakdown of all engagement activities such as URL where MMO was shown, when, ad/MMO id, when did the interaction start, challenge shown, valid response for the challenge, response received from the user through the widget, success/failure, when was the success/failure, and geoip from where the requests came.

These metrics may be very useful for independent MMO providers and HIP object publishers and may also be used to provide generic analytics to the third parties, such as but not limited to advertisers, market research firms who may want to understand what MMOs/ads would serve well for a specific user profile.

Dynamic Pricing Model Based on the Target

An embodiment provides a pricing component which monitors a target website or other clients using various parameters such as but not limited to traffic, context, quality, demography, and industry. By monitoring these statistics pricing component sets the price for the MMOs by using various classification schemes such as a static table map (a table based classification, for example, column A describes MMO and Column B describes price), static buckets (a table based classification where industry buckets have similar pricing), or dynamic (a dynamic pricing scheme based on the parameters collected by the target websites or any other clients). For example, an ad from a mortgage company (MMO/ad) with HIP capabilities is served on a financial website blog with traffic of few hundred/month (referred to as Site A), served on a top tier financial site having five million users/month (referred to as Site B) and served on a general news site having five million users/month (referred to as Site C). After serving ads to the different widgets from MMOS, the database contains details about how many instances the MMO was served and which site. The price to charge a MMO with HIP capabilities may be from a static table such as something based on a tiered based approach for traffic, e.g. Site B and C would be the same and Site A may be different based on traffic; based on a table which specifies pricing based on verticals, e.g. Site A and Site B may be same and Site C different; and based on demographics served and time served on Site C. If the general news site, e.g. Site C, is getting users from USA and an overseas country and the mortgage company does business only in USA, the dynamic pricing may kick in where cost to serve to traffic from USA may be different from the remaining. This determination may be performed as an asynchronous process or dynamically at the time of serving by having simple lookup tables in the database defining the pricing rules and comparing it with the traffic data at the time of serving or post serving.

Use Case: HIP as a Banner Ad

As mentioned hereinabove, online advertisers suffer from banner blindness problem where viewers get accustomed to ignoring looking at ads and just focusing on the interesting content on the webpage. Not only the effectiveness of banner ads is decreasing, but the marketing campaign messages are not easily reached by the users. Many advertisers try to provide brand messaging by being creative in the banner ads however such brand messaging has been found to be difficult to retain in the user's mind for a long term. One reason for the short term impression of banner ads is the lack of interaction between the users and the advertisers. Sole visual or audio impressions have a lesser impact on the audience, than when the users interact and get involved with an advertisement.

Thus, consider the following use case example. An interaction window displays a crying infant. The user is asked to change his diapers and is given the option to select from a few enlisted diapers. In response, the user selects the diaper choices one by one on the infant, until the infant wears his favorite diaper of a particular brand "ABC." On wearing his favorite diaper, the infant stops crying and smiles, indicating that the user has successfully solved the ad based HIP. Such an interactive advertisement is probable to have a long term impact on a users' mind, such that when the user sees the "ABC" branded diapers in the market, he is able to relate the diaper to the smiling infant. Therefore, the user would be more likely to buy the "ABC" branded diapers, compared to the other choices in the market.

Use Case: Social MMOS HIP

For purposes of discussion herein, social MMOs are defined as multimedia objects which can be owned by an individual person or a social group including the person or a generic social group. Such social group may include people who share some relation or acquaintances to each other. As well, such people may otherwise share something in common. Such kind of social MMOs may also be enabled for HIP capabilities. For example, only the members of the social group MMO will be able to understand the details of MMOs making it difficult for bots to decipher such MMO. For example, consider a social MMO that is a video of an outdoor event. In that video, a person, e.g. John, is jumping over a wall. Thus, the HIP challenge may be developed as "What is John doing over the wall?" Only people who know John are able to provide a correct response to such challenge. Such type of HIP system allows people to personalize the HIP system or make it social.

Such social MMOs HIP may also be used by commercial entities to increase the brand awareness or marketing campaigns among their loyal customers. For example, a regional soccer team may have a fan website. On that website to filter human traffic and further filter only the fan traffic, there may be images of the soccer team with trivia challenges associated with the team. In any web workflow associated with the website such as downloading wallpaper images of the star player of the team, a image which shows the team may be served with the challenge "click/tap on the captain of the team here" or "click/tap on the goalkeeper". Being a regional team and being on a regional, social fan website, may help to promote the brand as well as serve as a MMO with social and HIP capabilities.

In an embodiment, such MMOs may be created, shared, or fed by some forums automatically, such as but not limited to web feed providers or image and video hosting websites.

Placement of Challenge and Response Format

It should be appreciated that an HIP system in accordance with embodiments herein has a format (model/template) which has capability of placing response and challenge objects independent of location on a webpage. For instance, a challenge may be presented within an MMO or such challenge may be presented outside the MMO. As well, a challenge may also be placed on a webpage according to different positions within a workflow. For example, the challenge may be integrated with MMO such as "click on the man in the image" or the challenge may appear outside the MMO such as "drag the red circle available outside the image to the person in the image". Similarly, a response may be within an MMO or outside the MMO.

Example Screen Shots

Following are a few sample screen shots according to embodiments herein. Such samples are for illustrative purposes and are not meant to be limiting. FIG. 8 is a sample screen shot of a webpage 800 at which the user would like to add a comment. In the particular example, am instruction for a challenge is provided as a sentence 802, "Please answer this simple math question." The math question 804 is presented below the instruction. The response attribute is shown as a text bob 806 in which the user types in the answer. Upon success, the user is then able to post his or her comment.

Figure 9:
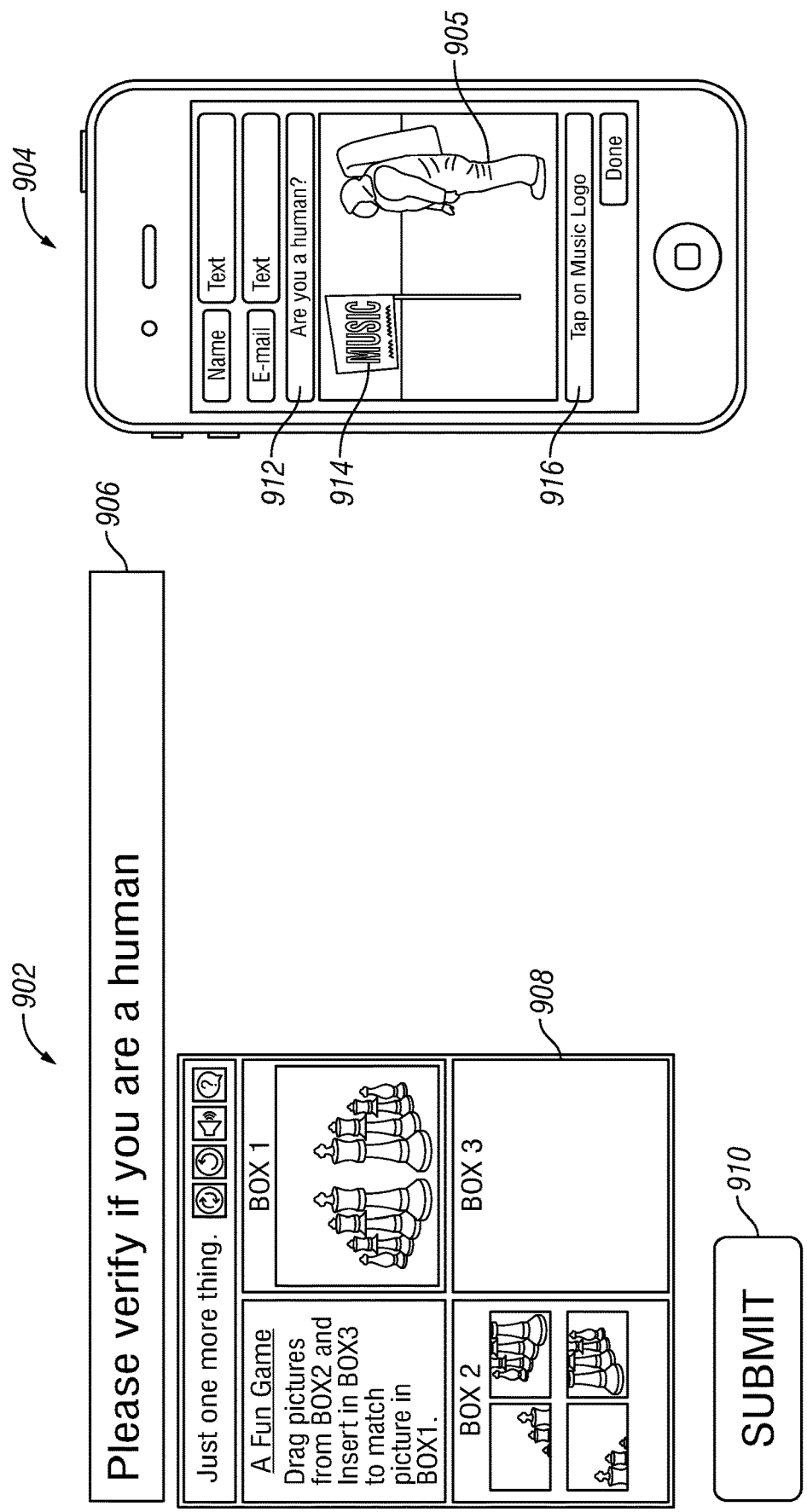
FIG. 9 is combination of sample screenshots of sample multimedia objects with HIP capabilities, according to an embodiment.

FIG. 9 is combination of two sample screenshots of sample MMOs with HIP capabilities (902 and 904). For sample screenshot 902, an instruction 906 is provided in text format, asking the user to verify that they are indeed human. Below such instruction, a MMO with HIP capabilities 908 is provided. MMO 906 contains a puzzle 908. To solve the puzzle, the human user must drag pictures from BOX 2 to BOX 3 to match the image in BOX 1. The sample also has a submit button 910 for the user to click when the user wants to submit his or her solution to puzzle 908.

As well, sample screenshot 904 contains a MMO with HIP capabilities 905 in which an interactive logo 914 is provided. Above MMO 905 is a question 912 for the human user, which reads, "Are you a human?" Below MMO 905 is an instruction 916 in text format, which states, "Tap on MTV logo" Thus, to solve the challenge, the user must tap on logo 914.

An Example Machine Overview

Figure 15:
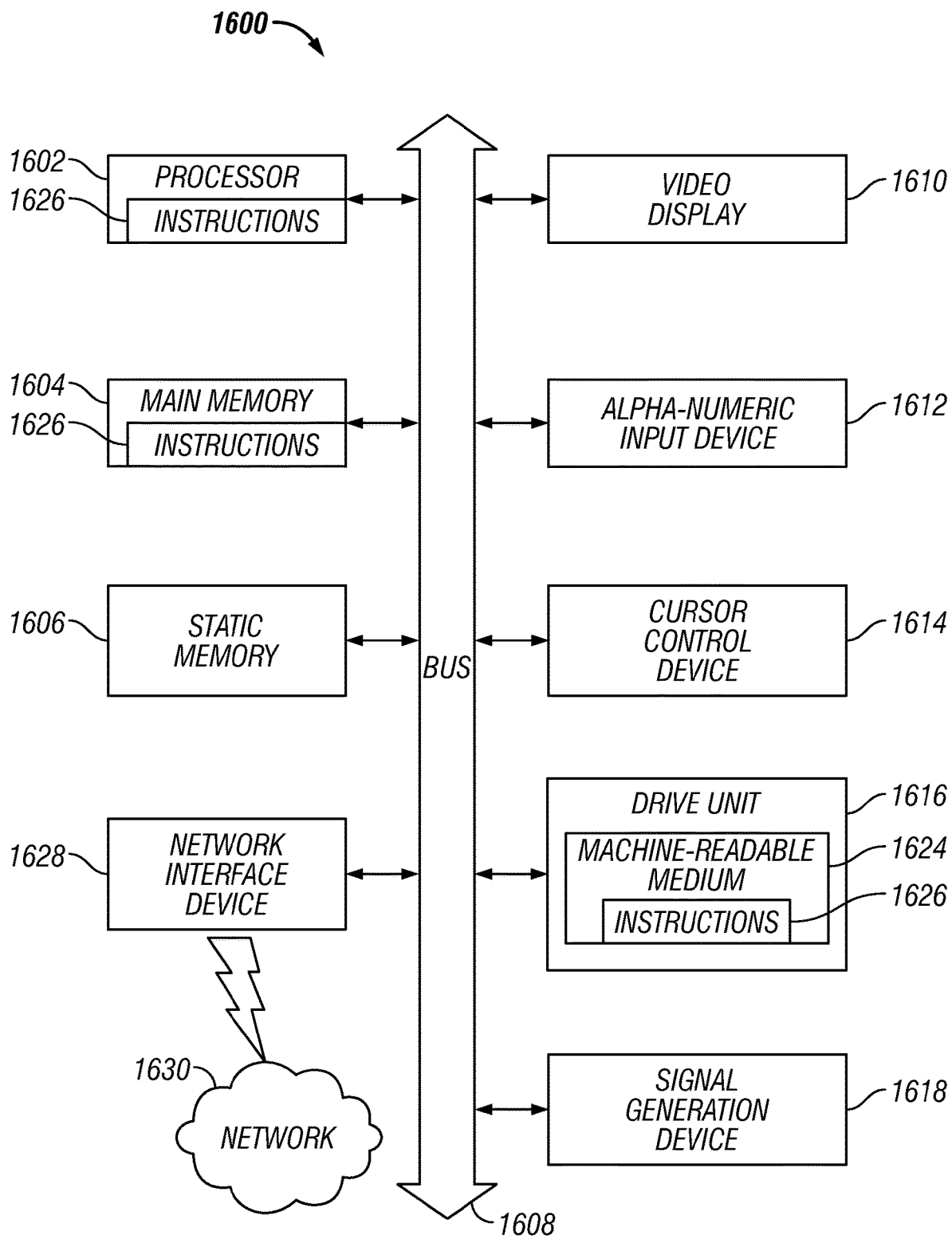
FIG. 15 is a block schematic diagram of a system in the exemplary form of a computer system, according to an embodiment.

FIG. 15 is a block schematic diagram of a system in the exemplary form of a computer system 1600 within which a set of instructions for causing the system to perform any one of the foregoing methodologies may be executed. In alternative embodiments, the system may comprise a network router, a network switch, a network bridge, personal digital assistant (PDA), a cellular telephone, a Web appliance or any system capable of executing a sequence of instructions that specify actions to be taken by that system.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1620.

The disk drive unit 1616 includes a machine-readable medium 1624 on which is stored a set of executable instructions, i.e. software, 1626 embodying any one, or all, of the methodologies described herein below. The software 1626 is also shown to reside, completely or at least partially, within the main memory 1604 and/or within the processor 1602. The software 1626 may further be transmitted or received over a network 1628, 1630 by means of a network interface device 1620.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a system or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Further, it is to be understood that embodiments may include performing operations and using storage with cloud computing. For the purposes of discussion herein, cloud computing may mean executing algorithms on any network that is accessible by internet-enabled or network-enabled devices, servers, or clients and that do not require complex hardware configurations, e.g. requiring cables and complex software configurations, e.g. requiring a consultant to install. For example, embodiments may provide one or more cloud computing solutions that enable users, e.g. users on the go, to engage in a challenge-response system and method on such internet-enabled or other network-enabled devices, servers, or clients. It further should be appreciated that one or more cloud computing embodiments include capabilities to engage in a challenge-response system and method using mobile devices, tablets, and the like, as such devices are becoming standard consumer devices.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. An apparatus for generating and serving a multimedia object with human interaction proof capabilities on a webpage, comprising:
   a multimedia object server having at least a processor and at least a memory, said multimedia object server configured to:
      receive a request for the multimedia object, wherein the request includes parameters, said parameters comprise:
      device data, wherein the device data includes data about a device that is sending the request;
      temporal information of the request;
      spatial information of the request;
      Internet Protocol (IP) address associated with the request and the device sending the request;
      software information of the software that is sending the request; and
      webpage related information comprising any of information context, language of the webpage, industry category of the webpage, global positioning system location (GPS) for GPS enabled devices, and a theme of the multimedia object;
      determine a level of suspicion using the parameters of the request including the IP address, spatial information, temporal information, the software information, and the webpage related information, and wherein the determination of the level of suspicion includes analyzing historical data to interpret the IP address;
   classify the request into suspicion buckets based on the level of suspicion, wherein each distinct suspicion bucket is a buffer associated with a degree of suspiciousness and a level of difficulty of a challenge associated with the multimedia object, and wherein the suspicion buckets include a very suspicious suspicion bucket, low suspicious suspicion bucket, and a fatal suspicion bucket;
   determine a device capability of the device associated with the request, wherein the device capability includes an interaction type of click, draw or type;

determine a matched multimedia object and associated challenge using the level of difficulty of one of the suspicion buckets associated with the request and the interaction type associated the device, wherein the matched multimedia object is a video comprising any of a bundled advertisement, personal images, corporate internal branding images/texts, house advertisement, and promotion information, and wherein the associated challenge involves any part of said matched multimedia object;

send the matched multimedia object and the associated challenge to the webpage;

receive a response to the challenge associated with the matched multimedia object including the video, and response-related informational data, said response-related informational data comprising any of what was clicked on, how long the multimedia object was on active screen, how many times an interaction was performed, how the multimedia object was interacted with, question of the challenge, current time, the IP address from where the response and informational data arrived, the device and software from where the response and informational data arrived, and duration of any interaction;

when human interactive proof is enabled in the response, compare the received response against validated responses and send a success notification or a failure notification to said webpage based on the comparison;

when human interactive proof is not enabled, validation is performed but validation notification is not sent;

store the response related information data and the validation response as historical data; and generate analytics about the matched multimedia object, the associated challenge, and the webpage using said response-related informational data, wherein the analytics include the updated level of difficulty associated with the matched multimedia object and the associated challenge.

2. The apparatus of claim 1, wherein said stored multimedia objects are on and served by at least one external ad network owned or controlled by a third party multimedia object provider.

3. The apparatus of claim 2, wherein the generated analytics are sent to said ad network or third party analytics collector.

4. The apparatus of claim 1, wherein said multimedia object is configured to be turned on and off for the challenge in a user workflow.

5. The apparatus of claim 1, wherein said challenge is part of a financial transaction involving coupon codes or rewards points of a vendor or common reward points for multiple vendors and wherein when said response is successful, said multimedia object server is configured to send related informational data to a financial system of said vendor.

6. The apparatus of claim 1, wherein said challenge is user-defined.

7. The apparatus of claim 1, wherein said multimedia object server comprises and uses methods to detect misuse of said multimedia object.

8. The apparatus of claim 1, wherein said multimedia object server is configured to automatically and dynamically generate said bundled advertisement and challenge by applying methods which are random and independent of said multimedia object.

9. The apparatus of claim 1, wherein said bundled advertisement and challenge is any of: motion-based; gravity-based; geo-location-based; and direction-based.

10. The apparatus of claim 1, wherein said serving of said multimedia object is based on Artificial Intelligence (AI) based HIP delivery including based on suspicious or friendly HIP service caller zones and wherein the level of toughness of challenges are managed respectively.

11. The apparatus of claim 1, wherein user interactivity on said multimedia object is shared via social networks.

12. The apparatus of claim 1, wherein said multimedia object is bookmarked for future reference.

13. The apparatus of claim 1, wherein said multimedia object or said challenge is voice based.

14. The apparatus of claim 1, wherein said challenge is subscription based.

15. The apparatus of claim 1, wherein the multimedia object is configured to allow redirection to an advertisement webpage or website and analytics collected of this action.

16. The apparatus of claim 1, wherein said multimedia object is configured for near field communications (NFC) and radio-frequency identification (RFID)-based devices for HIP capabilities.

17. The apparatus of claim 1, wherein said multimedia object server causes any of:

said challenge and response to be presented outside said multimedia object for HIP;

said challenge to be presented inside the multimedia object and said response to be presented outside the multimedia object; and said challenge and a particular message to be inside said multimedia object and said response outside the MMO.

18. A computer-implemented method for generating and serving a multimedia object with human interaction proof capabilities on a webpage or any other applications capable of accessing information using the Internet, comprising:

providing a multimedia object server configured to:

receive, via a processor, a request for the multimedia object, wherein the request includes parameters, said parameters comprise:

device data, wherein the device includes data about a device that is sending the request;

temporal information of the request;

spatial information of the request;

Internet Protocol (IP) address associated with the request and the device sending the request;

software information of the software sending the request;

webpage related information comprising any of information context, language of the webpage, industry category of the webpage, GPS global positioning system location (GPS) for GPS enabled devices, and a theme of the multimedia object;

determine a level of suspicion using the parameters of the request including the IP address, spatial information, temporal information of the request, the software information, and the webpage related information, and wherein the determination of the level of suspicion includes analyzing historical data to interpret the IP address;

classify the request into suspicion buckets based on the level of suspicion, wherein each distinct suspicion bucket is a buffer associated with a degree of suspiciousness and a level of difficulty of a challenge associated with the multimedia object, and wherein the suspicion buckets include a very suspicious suspicion bucket, low suspicious suspicion bucket, and a fatal suspicion bucket;

determine a device capability of the device associated with the request, wherein the device capability includes an interaction type of click, draw or type;

determine a matched multimedia object and associated challenge using the level of difficulty of one of the suspicion buckets associated with the request and the interaction type associated with the device, wherein the matched multimedia object is a video comprising any of a bundled advertisement, personal images, corporate internal branding imagines/texts, house advertisement, and promotion, marketing promotions/surveys, and content of the owned webpages or information and wherein the associated challenge involves any part of said matched multimedia object;

send the matched multimedia object and associated challenge to the webpage;

receive a response to the challenge associated with the matched multimedia object including the video, and response-related informational data, said response-related informational data comprising any of what was clicked on, how long the multimedia object was on active screen, how many times an interaction was performed, how the multimedia object was interacted with, question of the challenge, current time, the IP address from where the response and informational data arrived, the device and software from where the response and informational data arrived, and duration of any interaction;

when human interactive proof is enabled in the response compare the received response against validated responses and send a success notification or a failure notification to said webpage based on the comparison;

when human interactive proof is not enabled, validation is performed but validation notification is not sent;

store the response related information data and the validation response as historical data; and generate analytics about the matched multimedia object, the associated challenge, and the webpage using said response-related informational data, wherein the analytics include the updated level of difficulty associated with the matched multimedia object and associated challenge.

19. A non-transitory computer readable medium having stored thereon a computer program for generating and serving a multimedia object with human interaction proof capabilities on a webpage, said computer program comprising a program code which, when executed by a processor, performs the steps of:

providing a multimedia object server configured to:
receive a request for the multimedia object, wherein the request includes parameters, said parameters comprise:
device data, wherein the device data includes data about the device that is sending the request;
temporal information of the request;
spatial information of the request;
Internet Protocol (IP) address associated with the request and the device sending the request;
software information of the software that is sending the request; and
webpage related information comprising any of information context, language of the webpage, industry category of the webpage, global positioning system (GPS) location for GPS enabled devices, and a theme of the multimedia object;

determine a level of suspicion using the parameters of the request including the IP address, spatial information, temporal information, the software information, and the webpage related information, and wherein the level of suspicion includes analyzing historical data to interpret the IP address;

classify the request into suspicion buckets based on the level of suspicion, wherein each distinct suspicion bucket is a buffer associated with a degree of suspiciousness and a level of difficulty of a challenge associated with the multimedia object, and wherein the suspicion buckets include a very suspicious suspicion bucket, low suspicious suspicion bucket, and a fatal suspicion bucket;

determine a device capability of the device associated with the request, wherein the device capability includes an interaction type of click, draw or type;

determine a matched multimedia object and associated challenge using the level of difficulty of one of the suspicion buckets associated with the request and the interaction type associated with the device, wherein the matched multimedia object is a video comprising any of a bundled advertisement, personal images, corporate internal branding images/texts, house advertisement, and promotion information, and wherein the associated challenge involves any part of said multimedia object;

send the matched multimedia object and the associated challenge to the webpage;

receive a response to the challenge associated with the matched multimedia object including the video and response-related informational data, said response-related informational data comprising any of what was clicked on, how long the multimedia object was on active screen, how many times an interaction was performed, how the multimedia object was interacted with question of the challenge, current time, the IP address from where the response and informational data arrived, device and software from where the response and informational data arrived, and duration of any interaction;

when human interactive proof is enabled in the response, compare the received response against validated responses and send a success notification or a failure notification to said webpage based on the comparison;

when human interactive proof is not enabled, validation is performed but validation notification is not sent;

store the response related information data and the validation response as historical data;

and generate analytics about the matched multimedia object, the associated challenge, and webpage using said response-related informational data, wherein the analytics include the updated level of difficulty associated with the matched multimedia object and the associated challenge.

20. The apparatus of claim 1, wherein level of suspicion is based on historical data being dynamically determined using Artificial Intelligence (AI).

21. The apparatus of claim 20, wherein the level of suspicions is determined by the Artificial Intelligence (AI) having historical data being dynamically determined comprising a learning algorithm, and classifying parameters into two or more suspicion buckets.

* * * * *